United States Patent
Kulaga et al.

(10) Patent No.: US 8,209,740 B1
(45) Date of Patent: *Jun. 26, 2012

(54) SYSTEM AND METHOD FOR CONTROLLING ACCESS TO NETWORK RESOURCES

(75) Inventors: Andrey A. Kulaga, Moscow (RU); Alexander S. Tarasenko, St. Petersburg (RU); Damir R. Shiyafetdinov, Moscow (RU); Sergey A. Vasilyev, Reutov (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,627

(22) Filed: Sep. 20, 2011

(30) Foreign Application Priority Data

Jun. 28, 2011 (RU) .................................. 2011126334

(51) Int. Cl.
*H04L 29/06* (2006.01)
(52) U.S. Cl. ................... 726/1; 726/12; 726/27; 726/24; 726/4; 713/156
(58) Field of Classification Search .................. 726/1, 3, 726/27, 12, 4, 24; 713/156
See application file for complete search history.

(56) References Cited

U.S. PATENT DOCUMENTS

| | | | |
|---|---|---|---|
| 6,275,937 B1 * | 8/2001 | Hailpern et al. | 713/188 |
| 6,842,861 B1 * | 1/2005 | Cox et al. | 713/188 |
| 6,871,223 B2 | 3/2005 | Drees | |
| 7,047,562 B2 * | 5/2006 | Peterson et al. | 726/14 |
| 7,523,484 B2 * | 4/2009 | Lum et al. | 726/1 |
| 7,757,268 B2 * | 7/2010 | Gupta et al. | 726/1 |
| 7,792,113 B1 * | 9/2010 | Foschiano et al. | 370/392 |
| 7,818,739 B2 * | 10/2010 | Cox et al. | 717/171 |
| 7,882,538 B1 * | 2/2011 | Palmer | 726/1 |
| 7,926,108 B2 * | 4/2011 | Rand et al. | 726/22 |
| 7,984,493 B2 * | 7/2011 | Jones | 726/12 |
| 7,991,852 B2 * | 8/2011 | Bu et al. | 709/217 |
| 8,001,610 B1 * | 8/2011 | Chickering et al. | 726/27 |
| 8,024,449 B1 * | 9/2011 | Shiyafetdinov et al. | 709/223 |
| 8,024,450 B1 * | 9/2011 | Shiyafetdinov et al. | 709/223 |
| 2002/0199115 A1 * | 12/2002 | Peterson et al. | 713/201 |
| 2006/0031407 A1 * | 2/2006 | Dispensa et al. | 709/219 |
| 2006/0164199 A1 * | 7/2006 | Gilde et al. | 336/234 |
| 2007/0124797 A1 * | 5/2007 | Gupta et al. | 726/1 |
| 2007/0143851 A1 * | 6/2007 | Nicodemus et al. | 726/25 |
| 2007/0192858 A1 | 8/2007 | Lum | |
| 2008/0215668 A1 | 9/2008 | Hu | |
| 2009/0037594 A1 * | 2/2009 | Sever et al. | 709/230 |
| 2009/0100506 A1 * | 4/2009 | Whang et al. | 726/4 |
| 2009/0158407 A1 * | 6/2009 | Nicodemus et al. | 726/6 |
| 2009/0165132 A1 * | 6/2009 | Jain et al. | 726/22 |
| 2010/0192196 A1 | 7/2010 | Lee | |

* cited by examiner

*Primary Examiner* — David García Cervetti

(74) *Attorney, Agent, or Firm* — Arent Fox LLP; Michael Fainberg

(57) ABSTRACT

Disclosed are systems, methods and computer program products for controlling access to a computer network. An example network access controller is configured to intercept data transmission to or from a computer and identify a network access policy associated with said computer. If there is no network access policy associated with said computer, the controller deploys on said computer an administration agent configured to collect configuration information from said computer and information about topology of said network. The controller determines a network access policy for said computer based on the collected information. The controller also activates antivirus software on said computer, to detect any malicious activity on said computer. If malicious activity is detected, the controller limits data transmissions to or from said computer until the malicious activity is eliminated by the antivirus software to prevent spread of the malicious activity to other computers in the network.

15 Claims, 14 Drawing Sheets

SYSTEM AND METHOD FOR CONTROLLING ACCESS TO NETWORK RESOURCES

CROSS-REFERENCE TO RELATED APPLICATIONS

This application claims benefit of priority under 35 U.S.C. 119(a)-(d) to a Russian Application No. 2011126334 filed on Jun. 28, 2011, which is incorporated by reference herein.

TECHNICAL FIELD

This present disclosure relates generally to the field of network security and, more specifically, to systems, methods and computer program products for controlling access to the resources of corporate network.

BACKGROUND

Personal computers (PCs) have become essential part of any business enterprise. It is impossible to imagine a modern office, regardless of its size, without one or more PCs. The corporate PCs are typically connected in a network, which enables secure communication and file exchange between PC users as well as secure access to the outside networks, such as the Internet. However, administration of a large corporate network, having hundreds and often thousands of PCs and other networked devices, such as printer, scanners, facsimile machines, mobile communication devices, is a complicated task for several reasons.

First, corporate networks are quite susceptible to security breaches and spread of malware. So, for example, it is enough for one PC to be infected with malware, the malware will easily spread to other PCs in the network. These security incidents may cause temporary malfunction or permanent disablement of multiple PCs, which will cause decline in productivity of employees, loss of confidential information, and expenses related to repair of infected PCs.

Second, a network administrator often cannot manage keep track of all PCs in the corporate network. As the number of network users, including local and remote users, temporary users, guest users, etc., steadily increases, network administrators face the problem of controlling user access to the resources of the corporate network. Before granting user access to a network resource, the administrator has to determine if user is allowed to access this resource. In a large corporate network, solution of this problem takes significant amount of time.

Accordingly, there is a need for automation of a process of administration of corporate network and controlling access to network resource to various network users.

SUMMARY

Disclosed are systems, methods and computer program products for controlling access to network resources. In one example embodiment, the method comprises intercepting by a network access controller a data transmission to or from a computer; identifying by an administrative agent deployed on the network access controller a network access policy associated with said computer; if there is a network access policy associated with said computer, allowing the data transmission to or from said computer based on the associated network access policy; if there is no network access policy associated with said computer, deploying on said computer an administration agent configured to collect configuration information from said computer and information about topology of said network and send the collected information to the network access controller; determining by the administrative agent of the network access controller a network access policy for said computer based on the collected information; redirecting the intercepted data transmission based on the network access policy; activating via the administrative agent of said computer an antivirus software on said computer, the antivirus software configured to perform antivirus analysis of said computer, and, if a malicious activity is detected on said computer, report about said activity to the network access controller; and limiting by the network access controller data transmissions to or from said computer until the malicious activity is eliminated by the antivirus software to prevent spread of the malicious activity to other computers in the network.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments, its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for controlling access to network resources. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1A:
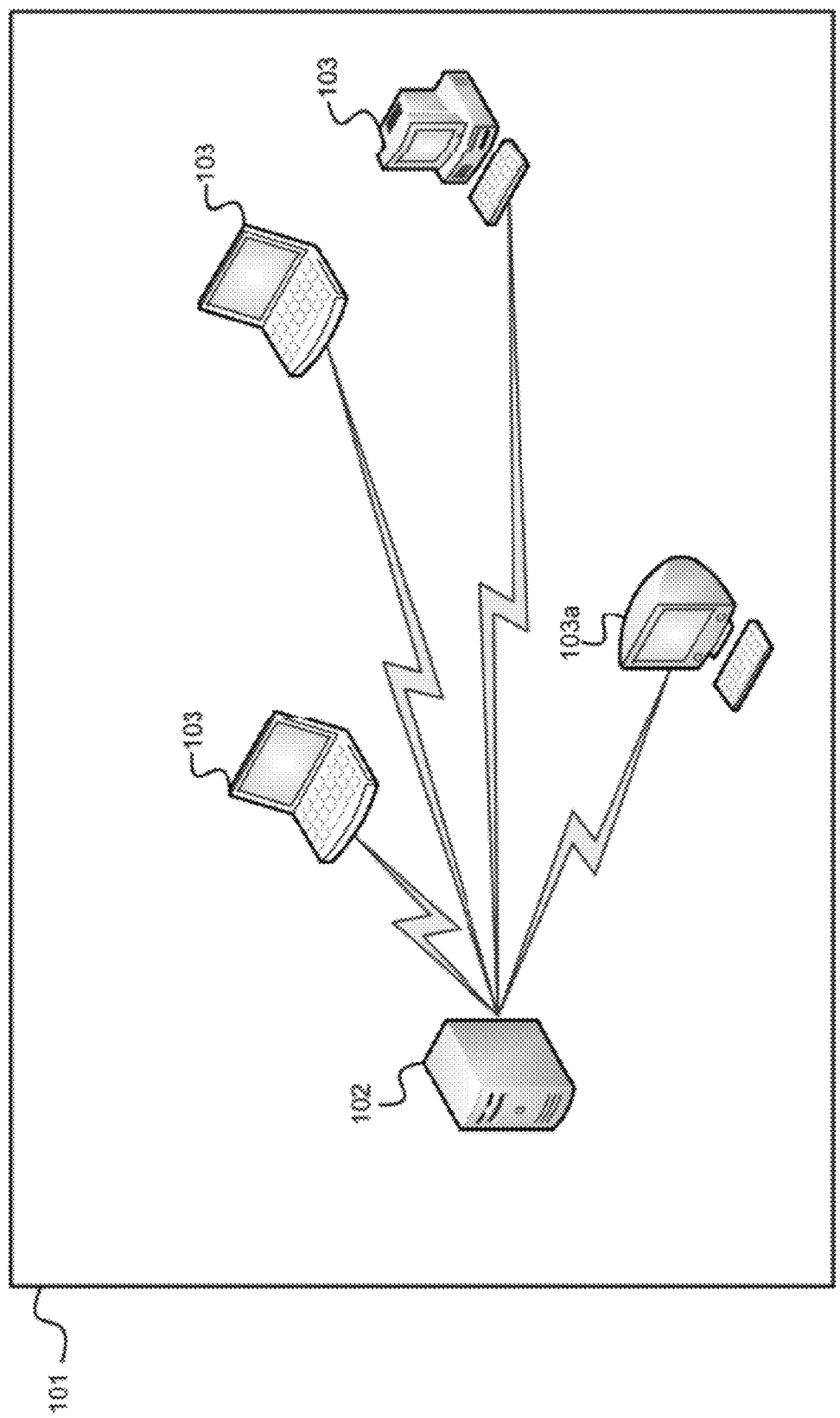
FIG. 1A illustrates a schematic diagram of a system for controlling access to resources of a medium-size corporate network for PC users in accordance with one example embodiment.

FIG. 1A illustrates a schematic diagram of a system for controlling access to resources of a medium-size corporate network for PC users in accordance with one example embodiment. As depicted, network 101 that can be, for example, a corporate network, may consist of multiple PCs 103. Remote administration tasks of any networked PC 103 by administration server 102 may be solved via direct connection of PC 103 of the network 101 to administration server 102. Therefore, administration server 102 is also located in the network 101. Each PC 103 has an administration agent installed thereon to which the administration server 102 sends control signals, as required, and which communicates to administration server 102, as needed. The remote administration tasks include a wide range of activities provided by the administration server 102 to the PCs 103, including:

updating anti-virus databases and software modules on PC 103;

managing policies and group tasks of any PC 103;

remote installation of applications and patches on any PC 103;

searching for vulnerabilities in any PC 103;

software and hardware inventory of any PC 103; and storing any information on the administration server 102.

The above list of tasks is merely exemplary and it does not limit the capabilities of administration server 102.

Administration agent deployed on the administration server 102 is also operable to search for new PC 103a in the corporate network 101 or one of its subnets. Administration agent also controls access of PCs 103, including new PC 103a, to the resources of the corporate network 101 in accordance with certain rules and policies. The primary administrative tasks handled by the administration agent of the administration server 102 in connection with management of access by PCs 103 to the corporate network include, but are not limited to:

intercepting broadcast packets (e.g., ARP and Netbios) for the purpose of detection of existing and new PCs connected to the corporate network 101 or an individual segment thereof;

intercepting and redirecting traffic for new and guest PCs, as well as other devices having limited access to the corporate network 101 or an individual segment thereof;

collecting information from a new PC 103a connected to the corporate network or one of its segments;

determining network access rules or policies for a new PC 103a; and limiting access to the resources of the corporate network.

As soon as the administrative agent detects that new PC 103a has appeared on corporate network 101 or an individual segment of it, traffic from that new PC 103a may be intercepted and redirected to administration server 102 for further analysis of the possibility of granting access to the resources of corporate network 101 to that new PC 103a according to certain network access rules or policies.

Figure 1B:
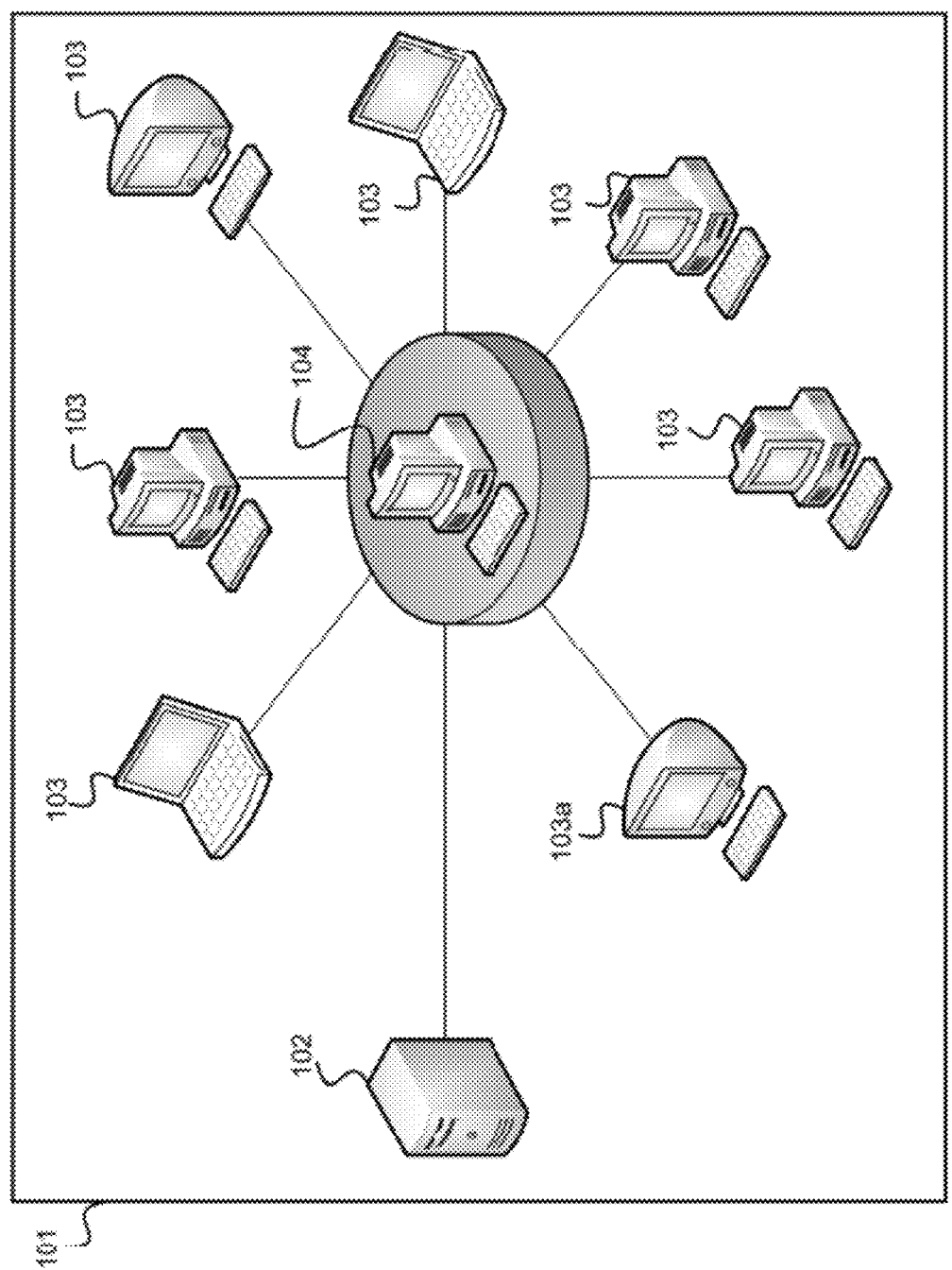
FIG. 1B illustrates a schematic diagram of a system for controlling access to resources of a large-size corporate network for PC users via a local administration server in accordance with one example embodiment.

FIG. 1B depicts a diagram of one example embodiment of an access control system that controls access to resources of corporate network 101 for PCs 103 for large, distributed corporate network 101, when administration server 102 belongs to corporate network 101.

When corporate network 101 or an individual segment thereof contains multiple PCs 103, another approach is used to search for new PCs 103a connected to network 101 and to control access to the resources of corporate network 101 for all PCs 103, including new PCs 103a, according to certain network access rules or policies.

In this case, the administration server 102 selects from multiple PCs 103 with administrative agents installed on them one Network Access Control PC 104 (hereinafter NAC-PC or network access controller). Then this NAC-PC 104 serves as the computer that controls access to corporate network resources, searches for new PCs 103a on corporate network 101 or an individual segment thereof, and grants access to all PCs 103, including new PCs 103a, to the resources of corporate network 101 according to certain rules or policies. NAC-PC 104 with an administrative agent installed on it is intended to perform the same tasks as administration server 102 in the simplest case, i.e.:

intercepting broadcast packets (ARP and Netbios) to obtain information about existing devices and new devices connected to corporate network 101 or an individual segment thereof;

redirecting traffic for new and guest PCs and devices with limited access to corporate network 101 or its individual segments;

collecting information from a new PC 103a connected to the corporate network or an individual segment thereof;

defining the rules for access to the resources of corporate network for new PCs 103a;

restricting access to the resources of corporate network.

Any PC 103 with an administrative agent installed on it can establish a connection with administration server 102 using that administrative agent. NAC-PC 104 can also collect information about all devices on corporate network 101 or an individual segment thereof. Note that each segment of the corporate network 101 may have its own NAC-PC 104.

Figure 1C:
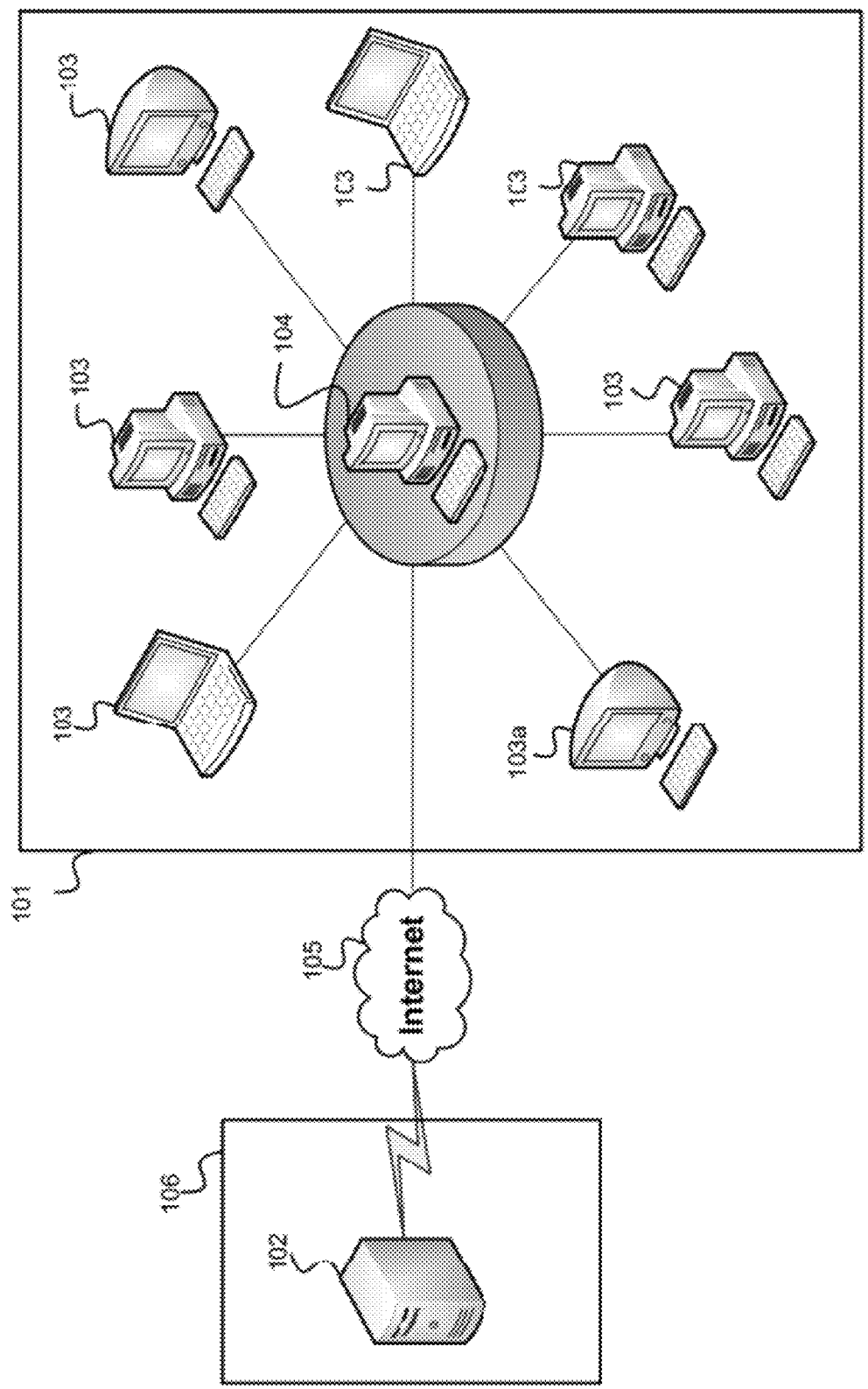
FIG. 1C illustrates a schematic diagram of a system for controlling access to resources of a large-size corporate network for PC users via a remote administration server in accordance with one example embodiment.

FIG. 1C depicts a diagram of an example embodiment of the access control system that controls access to the resources of corporate network 101 for PCs 103 in a large and distributed corporate network 101, when administration server 102 belongs to network 106, which is different from corporate network 101. In this case, communication between PCs 103 from the corporate network 101 or an individual segment thereof with an administrative agent installed on it and administration server 102, which is on another computer network 106, is through the Internet 105. To control access to the resources of corporate network 101, search for new PCs 103a on corporate network 101 or an individual segment thereof, and grant all PCs 103, including and new PCs 103a, access to the resources of corporate network 101 according to certain network access rules or policies, administration server 102, on another computer network 106, selects for communication one NAC-PC 104 from corporate network 101 or an individual segment thereof with an administrative agent installed on it from the multiple PCs 103. Communication with administration server 102 is through the administrative agent installed on NAC-PC 104. Any PC 103 with Internet access can be connected with administration server 102 using the administrative agent installed on that PC 103, if PC 103 from corporate network 101, which is different from the computer network 106 of administration server 102 or an individual segment thereof, is not connected to the internet, that PC 103 can establish a connection with administration server 102 through NAC-PC 104. A connection between NAC-PC 104 and any PC 103 from corporate network 101, which is different from computer network 106 of administration server 102 or an individual segment thereof, is established between their administrative agents. Administrative agents installed on NAC-PC 104 and any PC 103 do not differ from one another.

Figure 2A:
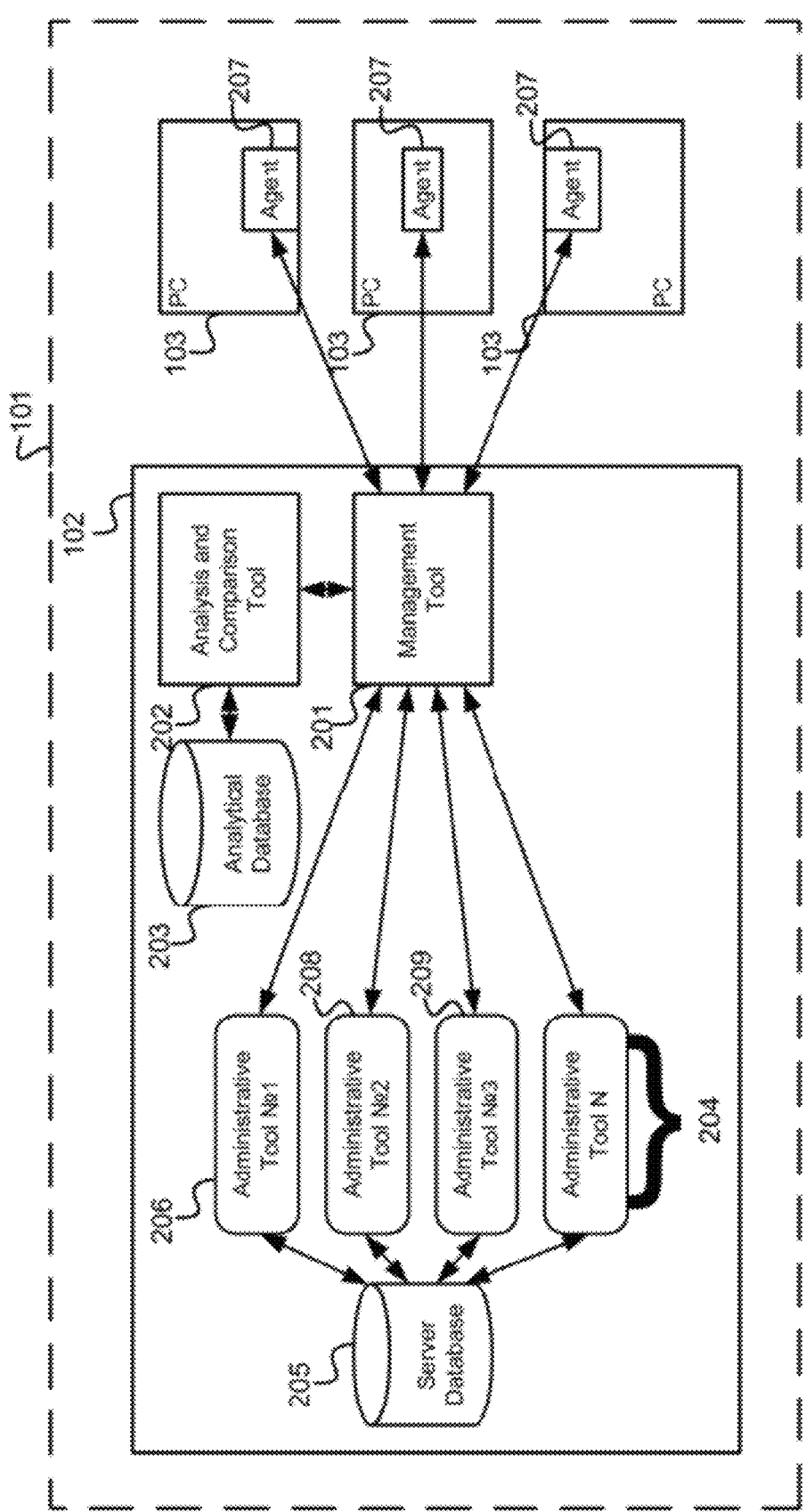
FIG. 2A illustrates a diagram of interaction between the administration server and all networked PCs in the corporate network in accordance with one example embodiment.

FIG. 2A depicts the detailed interaction of administration server 102 and all PCs 103 within corporate network 101 or an individual segment thereof. Administration server 102 in this case is also on corporate network 101. Each PC 103 from corporate network 101 or an individual segment thereof may be different; each PC 103 has its own software and hardware configuration, PC 103 may be a netbook not intended for serious computations or a high-productivity personal computer. Various numbers of applications, including resource-intensive, may be installed on a particular PC 103 on corporate network 101 or an individual segment thereof. Because of these differences in software and hardware configurations, total productivity varies for each PC 103. Each PC 103, depending on its location within the corporate network 101 or an individual segment thereof, has different parameters, such as channel bandwidth and response time. Control of access to the resources of corporate network 101, the search for new PCs 103a on corporate network 101 or an individual segment thereof, and the granting of access to the resources of corporate network 101 according to certain rules or policies to all PCs 103, including and new PC 103a, affect the productivity of NAC-PC 104, which performs these tasks. To accomplish these tasks most efficiently in corporate network 101 or an individual segment thereof, NAC-PC 104 must therefore have great productivity, maintain constant availability, and it must be optimally located on corporate network 101 or an individual segment thereof and have minimum response time and maximum channel bandwidth. As stated earlier, administration server 102 that is used to control access to the resources of corporate network 101, search for new PCs 103a on corporate network 101 or an individual segment thereof and to grant PCs 103, including and new PC 103a, access to the resources of corporate network 101 according to certain rules or policies, and in a special case to communicate with remote PCs 103 on corporate network 101 or an individual segment thereof, selects from multiple PCs 103 the one that will be NAC-PC 104 and that will be used to perform the tasks listed above. Following is a description of the mechanism for identifying NAC-PC from multiple PCs 103 on corporate network 101 or an individual segment thereof.

In one example embodiment, administration server 102 includes a series of administrative tools 204, server database 205, analytical database 203, analysis and comparison tool 202, and management tool 201. In one example embodiment, administrative tools from the series of administrative tools 204 are necessary for remote administration and to control access to the resources of corporate network 101, both for existing PCs 103 on corporate network 101 or an individual segment thereof and for new PCs 103a recently connected to corporate network 101 or an individual segment thereof. These administrative tools might be tools to build the topology of corporate network 101 or an individual segment thereof, distribute updates and patches to PCs 103, search for and delete vulnerabilities on PCs 103, or inventory data on the software and hardware configuration of each PC 103 from corporate network 101 or an individual segment thereof. The series of administrative tools 204 also includes tool 208 to control access to the resources of corporate network 101. The list of administrative tools from the series of administrative tools 204 is not limited to these examples, and there may be any number of administrative tools of administration server 102 that are necessary to perform various remote administration tasks.

In one example embodiment, server database 205 may be used by the administrative tools from the series of administrative tools 204 on administration server 102. Server database 205 may be implemented based on products such as IBM DB2, MS SQL Server, Sybase, PostgreSQL and others. Server database 205 may contain updates for various applications, information on the topology of the corporate network 101 or an individual segment thereof, patches, lists of known vulnerabilities, information about the hardware and software configuration of each PC 103 from corporate network 101 or an individual segment thereof, criteria and rules or policies to control access to the resources of corporate network 101 and so on. Each PC 103 on corporate network 101 or an individual segment thereof may have an administrative agent 207, which is used to perform remote administration tasks and control access to the resources of corporate network and for communication between PCs 103 on corporate network 101 or an individual segment thereof and administration server 102. Each PC 103 from corporate network 101 or an individual segment thereof also has its own unique network addresses.

In one example embodiment, management tool 201 is initially intended for direct communication by administration server 102 with all PCs 103 from corporate network 101 or an individual segment thereof. After the PC 103 from corporate network 101 or an individual segment thereof that is most suitable for the role of NAC-PC 104 is identified, management tool 201 will also be intended for direct communication with NAC-PC 104 to perform tasks with respect to controlling access to the resources of corporate network 101. NAC-PC 104 will be able to communicate with all PCs 103 from corporate network 101 or an individual segment thereof, collect information, and apply rules or policies, thereby granting or restricting access to the resources of corporate network 101. Information on administrative tools from the series of administrative tools 204 is also transferred via management tool 201.

In one example embodiment, administration server 102 is a computer that is capable of providing computer security and administration services. These functions are implemented using corporate products such as Kaspersky® Security for Microsoft Exchange Server, Kaspersky® Anti-Virus for Windows Servers, Kaspersky® Anti-Virus for Windows® Workstations and others that can be managed using management tool 201, which is, for example, the Kaspersky® Administration Kit.

At the initial stage administration server 102, i.e., management tool 201, communicates directly with all PCs 103 from corporate network 101 or an individual segment thereof to obtain information from each PC 103 that is necessary to identify the PC 103 that is most suitable for the role of NAC-PC 104. In a special case, administrative agents 207 of all PCs 103 from corporate network 101 or an individual segment thereof have the ability, if required, to connect directly to server 102, i.e., to management tool 201. On administration server 102 the series of administrative tools 204 includes tool 206 for inventorying (i.e., collecting information about the software-hardware configuration) of any PC 103 from corporate network 101 or an individual segment thereof. This tool is necessary to interact with administrative agent 207 of any PC 103 to launch inventory tasks remotely. At the initial stage tool 206 from the series of administrative tools 204 will be used to generate the task to inventory PCs 103 from corporate network 101 or an individual segment thereof. Management tool 201, having received information from tool 206 from the series of administrative tools 204 that the tasks have been generated for all PCs 103, will establish a connection with administrative agents 207 of all PCs 103 from corporate network 101 or an individual segment thereof and will transfer task data. Then administrative agents 207 of each PC 103 of corporate network 101 or an individual segment thereof collect information about the PC 103 on which they are installed.

Then, the topology of corporate network 101 or an individual segment thereof may be determined in accordance with one example embodiment. The administration server 102 includes a series of administrative tools 204, of which tool 209 may be configured to determine the topology of corporate network 101 or an individual segment thereof. This tool 209 is obtains data about all network devices on corporate network 101 or an individual segment thereof and information about the channel bandwidth and response time of each PC 103. Topology determination tool 209 interacts with the administrative agents 207 of PCs 103 and other network devices on corporate network 101 or an individual segment thereof to obtain the information necessary to determine network topology. Network devices may include such devices as network concentrators, switches, and routers. At the initial stage, tool 209 generates a task to determine the topology of corporate network 101 or an individual segment thereof. Management tool 201, having obtained information from tool 209 that the task has been generated, will establish a connection with administrative agents 207 of all PCs 103 from corporate network 101 or an individual segment thereof and with all network devices and will transfer task data. Then, the necessary information is collected that defines the topology of corporate network 101 or an individual segment thereof. Information may be collected using management tool 201 or administrative agents 207 of each PC 103 from corporate network 101 or an individual segment thereof. This information may include, but is not limited to:

the names and types of network devices that are on corporate network 101 or an individual segment thereof;

the channel bandwidth and response time for each PC 103;

the direction of network interaction, and, for example, the number of PCs 103 on corporate network 101 or an individual segment thereof connected to any network device.

This information is then transferred from management tool 201 to tool 209 used to determine the topology of corporate network 101 or an individual segment thereof, which stores the information in server database 205 and processes the information. Some of the collected data, for example, channel bandwidth and response time for each PC 103, are used to identify the PC 103 most suitable for the role of NAC-PC 104.

Accordingly, information collected during the inventorying of each PC 103 on corporate network 101 or an individual segment thereof and the determination of the topology of corporate network 101 or an individual segment thereof includes, but not limited to:

information about the type and basic parameters of the hardware capabilities of PCs 103, such as the type and clock speed of the CPU, the size of the memory, and etc.;

information about the software configuration, i.e.: which software, which version is installed on PCs 103, which software is installed on startup, agents of which programs are constantly running on PCs 103;

network addresses of PCs 103, i.e., MAC- and IP-addresses;

the availability of PCs 103;

information on the level of PC 103 utilization a short time after it is powered up;

channel bandwidth and response time for each PC 103.

This data set (Data) is merely exemplary and does not limit the capabilities of administrative agents 207 installed on all PCs 103 from corporate network 101 or an individual segment thereof. Collected Data for each PC 103 from corporate network 101 or an individual segment thereof have an identifier by which they are differentiated. This identifier may, for example, be the network address specific to each PC 103. After the Data are collected by administrative agents 207 of each PC 103 from corporate network 101 or an individual segment thereof, administrative agent 207 of each specific PC 103 transfers the Data to management tool 201. Management tool 201 in turn transfers the data to analysis and comparison tool 202. Analysis and comparison tool 202 is intended to identify the one PC 103 from multiple PCs 103 from corporate network 101 or an individual segment thereof that is best suited for the role of NAC-PC 104. To accomplish this, analysis and comparison tool 202 compares the Data with information from analytical: database 203. Analytical database 203 may be based on products such as IBM DB2, MS SQL Server, Sybase, PostgreSQL and others. Analytical database 203 contains rules for rating the productivity of each PC 103 from corporate network 101 or an individual segment thereof. These rules may be based on various variables such as:

central processor type;
central processor clock speed;
size of video memory;
type of video card;
size of operating memory;
availability;
PC 103 utilization a short time after it is powered up;
channel width for each PC 103;
response time for each PC 103, This set of variables is merely exemplary and does not limit the capabilities of the system. Each rule determines the productivity rating for a certain variable. These rules are necessary to generate a total productivity rating for each PC 103 from corporate network 101 or an individual segment thereof.

As an example, let's consider a limited number of variables that may be used as the basis for rules for rating productivity. Let corporate network 101 or an individual segment thereof for a simple example contain three PCs 103. All three PC 103 have different hardware and software configurations. For example, the first PC 103 is an Asus Eee PC 1005P netbook. The hardware configuration of that netbook includes elements such as an Intel Atom 1660 MHz central processor, 2028 Mb operating memory, an Intel GMA 3150 video card with 64 Mb video memory and the ability to use operating memory resources for its needs. The hardware configuration of the second PC 103 includes elements such as an Intel Core 2 i3-530 2930 MHz central processor, 4096 Mb operating memory, and an Asus ENGTX285/2DI/1GD3 video card with 1024 Mb of video memory. The third PC 103 is a notebook and has the following hardware configuration: Intel Celeron Dual Core 1200 MHz central processor, 2028 MB operating memory, and nVidia GeForce G 207M video card with 512 Mb video memory.

As stated earlier, administration server 102, i.e., management tool 201, will establish a connection with administrative agents 207 on PCs 103 and send tasks to perform inventory. Then administrative agents 207 of each PC 103 will collect the Data. These Data include information on the basic hardware components listed above. The Data may also include information about the availability of PC 103. Each PC 103 has a different availability time, for example, the first PC 103 provides 15 hours of uninterrupted operation; the second PC 103 30 hours; the third PC 103 20 hours. Then Data from administrative agents 207 of the three PCs 103 from corporate network 302 or an individual segment thereof are transferred through management tool 201 to analysis and comparison tool 202. Data collected for each PC 103 have an identifier that makes it possible to distinguish to which PC 103 the Data belong. For example, the identifier may be the network address unique to each PC 103. Analysis and comparison tool 202 compares the Data with information from analytical database 203 and selects the rule appropriate for each variable. In the example in question, the basic variables for defining the rules that contribute to the determination of the final productivity rating are processor clock speed, operating memory size, video memory size and availability. The rules for all variables may be based both on crisp and on fuzzy logic. In a special case when corporate network 101 or an individual segment thereof does not belong to the network of administration server 102, the existence of an internet connection will also be one of the variables for defining the rules. In this case if any PC 103 is not connected to the Internet, then that PC 103 cannot be connected to administration server 102 and send it data, and vice versa. Therefore, analytical database 203 may have a rule according to which, if corporate network 101 or an individual segment thereof does not belong to the network of administration server 102, then a PC 103 which has no internet connection cannot be NAC-PC 104.

Figure 3:
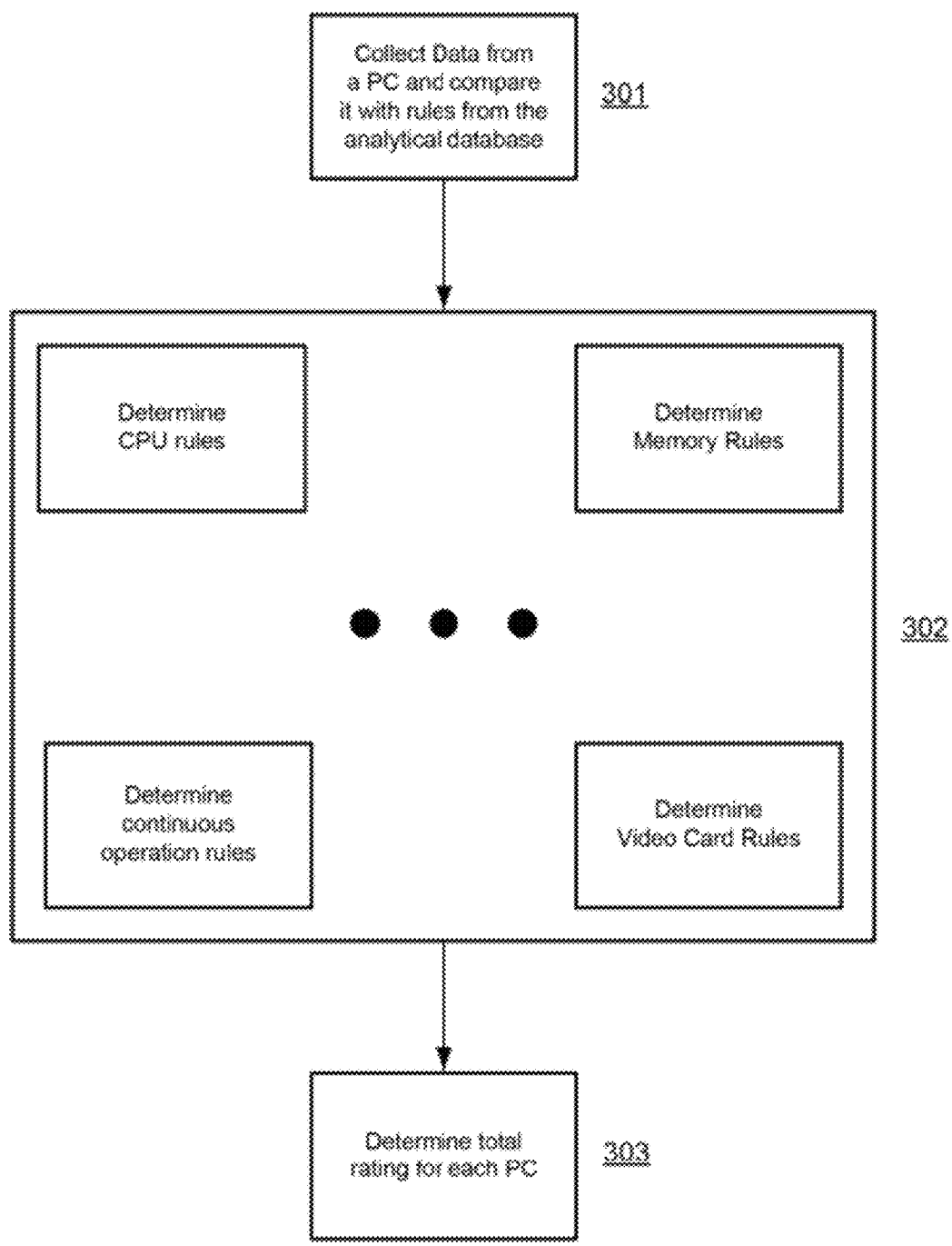
FIG. 3 illustrates an example algorithm for determining performance ratings of PCs in the corporate network based on crisp logic for the purpose of identification of best suitable PC for the role of NAC-PC in accordance with one example embodiment.

FIG. 3 depicts an example of the implementation of the algorithm for determining the productivity rating of each PC 103 from corporate network 101 or an individual segment thereof based on crisp logic to identify the PC 103 most suitable for the role of NAC-PC 104. At step 301 administrative agents 207 on PCs 103 collects Data when inventorying and determining the topology of corporate network 101 or an individual segment thereof. Then Data from administrative agents 207 of all PCs 103 from corporate network 101 or an individual segment thereof are transferred through management tool 201 to analysis and comparison tool 202 and are compared with information from analytical database 203. The next steps describe the decision logic on the basis of rules identified for the collected Data from analytical database 203. At step 302, the appropriate rule will be selected for each variable from analytical database 203. Thus, for the present example, at this step the rule for the central processor will be selected for all three PCs 103. Each rule for the central processor determines the productivity rating for the central processor. The central processor of the second PC 103. Intel Core 2 i3-530 2930 MHz, is more powerful than the Intel Celeron Dual Core 1200 MHz central processor of the third PC 103 and the Intel Atom 1660 MHz central processor of the first PC 103. For example, the rule for the example for the first PC 103 may be the following: "If the central processor is an Intel Atom 1660 MHz, then its rating is 1500". The rule for the second PC 103 may be the following: "If the central processor is an Intel Core 2 i3-530 2930 MHz, then its rating is 3000". The rule for the third PC 103 may be the following: if the central processor is an Intel Celeron Dual Core 1200 MHz, then its rating is 1000. A rule for operating memory will also be selected for all three PCs 103. In the same way as in the case of the central processor, the productivity rating will be determined for the operating memory according to the appropriate rules. Rules for operating memory may determine the productivity rating for operating memory of 2028 for the first and third PC 103 as 2000, while for the operating memory of 4096 of the third PC 103 it will be 4000. Then the rule for the video card will be selected for all three PCs 103. The video card of the second PC 103 is more powerful than that of the third and first PC 103 and has larger video memory. Rules for the video card may determine the productivity rating for the Intel GMA 3150 video card with 64 Mb of video memory in the first PC 103 as 100, for the Asus ENGTX285/2DI/1GD3 video card with 1024 Mb of video memory of the second PC 103 as 1000, and for the nVidia GeForce G 207M video card with 512 Mb of video memory of the third PC 103 as 500. The rule for availability (i.e., continuous operation) for all three PCs 103 will also be defined at this step. Rules for availability may define the productivity rating of the first PC 103, which runs continuously for 15 hours, as 1500, the productivity rating of the second PC 103, which runs continuously for 30 hours, as 3000, and the productivity rating of the third PC 103, which runs continuously for 20 hours, as 2000. The number of actions described in this step for defining particular rules is only an example, and there may be any number of variables and rules corresponding to these variables. At step 303, after obtaining data on all productivity ratings based on rules from analytical database 203, analysis and comparison tool 202 will sum the productivity ratings belonging to each of the three PCs 103. In this way the total productivity rating of the first PC 103 equals 5100, that of the second PC 103 equals 10100, and the total productivity rating of the third PC 103 equals 5500. Analysis and comparison tool 202 compares the total productivity ratings and selects the PC 103 whose total productivity rating is the highest. The second PC 103 has a higher total productivity rating than the first and third PC 103, as a result of which analysis and comparison tool 202 will note its network address on management tool 201 as the address of NAC-PC 104. Then management tool 201 for controlling access to the resources of corporate network 101, and in the special case for performing any remote administration tasks and transferring information from administration server 102 to any PC 103 or back, will connect with administrative agent 207 of the second PC 103, which thus becomes NAC-PC 104. Administrative agent 207 of the second PC 103 will be sent information advising administrative agent 207 of the status of NAC-PC 104. NAC-PC 104 will also perform tasks to search for new PCs 103*a* on corporate network 101 or an individual segment thereof and control access to the resources of corporate network 101 for all PCs 103, including new PC 103*a*, according to certain rules or policies.

Note that these examples do not limit the capabilities of the system in question. Information on total productivity ratings for all PCs 103 from corporate network 101 or an individual segment thereof and on the number of each PC 103 on the basis of the total productivity rating are also stored in analytical database 203. Analytical database 203 is regularly updated and contains current information. Information about all PCs 103 will be in ascending order of their total productivity ratings. Each individual segment of corporate network 101 may be assigned its own NAC-PC 104 using the approach described above. In a special case, analysis and comparison tool 202 also transfers to administrative agents 207 of each PC 103 information on the total productivity rating of each PC 103 from corporate network 101 or an individual segment thereof and its ranking according to the total productivity rating through management tool 201.

Figure 4:
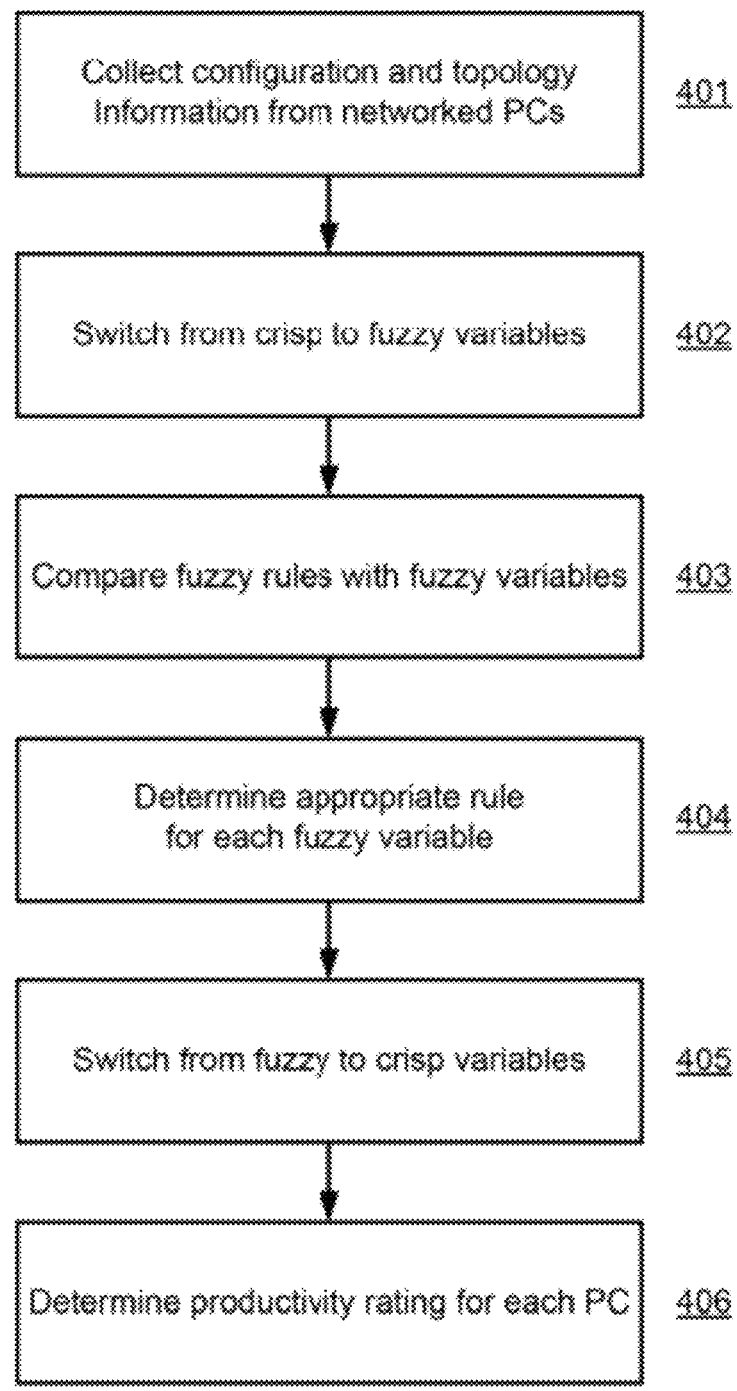
FIG. 4 illustrates an example algorithm for determining performance ratings of PCs in the corporate network based on fuzzy logic for the purpose of identification of best suitable PC for the role of NAC-PC in accordance with one example embodiment.

FIG. 4 depicts an example of the implementation of the algorithm for determining the total productivity rating of each PC 103 on corporate network 101 or an individual segment thereof based on fuzzy logic to identify the PC 103 most suitable for the role of NAC-PC 104.

At step 401 administration server 102, i.e., management tool 201, knowing all network addresses, establishes a connection with administrative agents 207 of all PCs 103 from corporate network 101 or an individual segment thereof. This takes place after tool 206 from the series of administrative tools 204, which is intended for inventorying PCs 103, generates an inventory task, and management tool 201, having obtained information from tool 206 from the series of administrative tools 204 that this task has been generated, will establish a connection with all PCs 103 from corporate network 101 or an individual segment thereof and transfer task data. If corporate network 101 or an individual segment thereof does not belong to the computer network of administration server 102, administrative agents 207 of all PCs 103 may establish a connection with administration server 102, i.e., with management tool 201, directly. Tool 209 from the series of administrative tools 204, which is intended for determining the topology of corporate network 101 or an individual segment thereof, generates a task to determine the topology of corporate network 101 or an individual segment thereof. Management tool 201, having obtained information from tool 209 that this task has been generated, will establish a connection with administrative agents 207 of all PCs 103 from corporate network 101 or an individual segment thereof and with all network devices and will transfer task data. Administrative agents 207 of all PCs 103 collect Data after establishing a connection with administration server 102, i.e., with management tool 201, and obtaining the inventory and topology determination tasks. After the Data have been collected by administrative agent 207 of each PC 103, they are transferred by administrative agents 207 of each PC 103 from corporate network 101 or an individual segment thereof to management tool 201. Management tool 201 in turn transfers these Data to analysis and comparison tool 202. The Data are tied to each PC 103 from corporate network 101 or an individual segment thereof by an identifier, for example, a network address that makes it possible to distinguish Data of one PC 103 from another. Collected Data includes information about multiple variables such as, for example, operating memory size. The majority of collected variables include information in crisp form, e.g., operating memory size of 4096 Mb.

Next, at step 402, the process of fuzzification—switch from crisp input variables to fuzzy variables—is performed. After fuzzification, at step 403, the fuzzy rules from analytical database 203 are compared with the fuzzy variables. As a result, after comparison, at step 404, a rule appropriate for the particular fuzzy variable will be found. This rule will describe the solution to the problem, in our case, determining the productivity rating of a particular PC 103, also in the form of a fuzzy variable. Step 405, the process of defuzzification—switch from fuzzy variables back to crisp variables—is performed. To carry out fuzzification and defuzzification, in addition to fuzzy rules, analytical database 203 also contains all meaningful linguistic variables with the number of determinations assigned for them with the specified exact physical values. Then, at step 406, the productivity ratings for each variable are determined and the total productivity rating for each PC 103 is determined.

The above algorithm may be illustrated in more detail using, as example, analysis of the size of operating memory. At step 401, let one of the variables included in the Data collected by administrative agent 207 of any PC 103 be operating memory of 4096 Mb. Data from that PC 103 were sent by its administrative agent 207 via management tool 201 to analysis and comparison tool 202. Analytical database 203 has a series of linguistic variables and definitions for them, including the linguistic variable "Operating memory size", for which there are, for example, three definitions such as "Low," "Medium" and "High." The ranges of values that correspond to a particular definition of the linguistic variable "Operating memory size" are also assigned. They are also found in analytical database 203. For example, an operating memory size from 0.1 to 2 Gb will correspond to the definition "Low"; a memory size from 2 Gb to 5 Gb will correspond to the definition "Medium"; and a memory size of 5 Gb or higher will correspond to the definition "High." At step 402, a switch from the crisp variable for "Operating memory size" of 4096 Mb to the fuzzy value "medium" is performed, which is called fuzzification. Then, at step 403, a comparison of the definition that corresponds to our operating memory size with the rules in analytical database 203 is performed. In the present case the rule may be: "IF operating memory size is Medium, THEN the productivity rating for the operating memory is Medium." At step 404, all similar rules defining the productivity ratings for each variable from the Data are determined.

In this way, the output will be fuzzy values, and it will be necessary to switch back to crisp values for the "operating memory productivity rating". At step 405, there will be a switch back to crisp physical variable values, which is called defuzzification. At this step, the range of values from analytical database 203 that corresponds to the definitions belonging to the resulting linguistic variables is determined. For example, it will be ascertained that a value in the range from 2000 to 4000 will correspond to the definition "Medium" of the linguistic variable "operating memory productivity rating." At step 406 the value that will make a contribution to the definition of the total productivity rating for each PC 103 will be selected from the values lying within certain ranges. For example, for our variable, "operating memory productivity rating," the value of 3000 will be selected. Similar actions will be taken for all variables from the collected Data. Analysis and comparison tool 202 then sums all productivity ratings for each variable, and a total productivity rating is obtained for each PC 103. The total ratings for each PC 103 are then compared, and the PC 103 having the highest total productivity rating is selected as NAC-PC 104. Its network address is noted by the management tool 201. Information on the total ratings of all PCs 103 from corporate network 101 or an individual segment thereof and the number of each PC 103 according to the productivity rating is also stored in analytical database 203. Information about all PCs 103 will be organized in increasing order of their total productivity rating. In the special case, analysis and comparison tool 202 will also send administrative agents 207 of each PC 103 information on the total productivity rating of the particular PC 103 from corporate network 101 or an individual segment thereof and its number according to the productivity rating via management tool 201.

There are also variables that do not need to be converted from crisp to fuzzy form. For example, the name of the software installed on any PC 103, about which it is known that a lot of computer resources are required to run it. This software might be, for example, graphic data processing software, for example Adobe® Photoshop®. This software uses more operating memory than the majority of applications installed on any PC 103. The productivity rating of PC 103 must therefore be calculated with allowance for similar applications. For example, the rule for Adobe® Photoshop® software installed on any PC 103 that is in analytical database 203 may be the following: "If Adobe® Photoshop® is installed, then the operating memory productivity rating decreases Slightly." Then it will be specified that a value in the range from 200 to 400 will correspond to the definition "Slightly" of the linguistic variable "operating memory productivity rating decreases". A value may be selected from values in the specified range that will make a contribution to the operating memory productivity rating. For example, a value of 300 will be selected for this case. In this way, a PC 103 with 4096 Mb operating memory and Adobe® Photoshop® installed will have a operating memory productivity rating of 3700.

NAC-PC 104 is therefore automatically selected from multiple PCs 103 from corporate network 101 or an individual segment thereof on the basis of the total productivity rating and will subsequently be used to control access to the resources of corporate network 101, search for new PCs 103*a* on corporate network 101 or an individual segment thereof and grant all PCs 103, including new PCs 103*a*, access to the resources of corporate network 101 according to certain network access rules or policies according to one example embodiment.

NAC-PC 104 is identified after the total productivity ratings of all PCs 103 from corporate network 101 or an individual segment thereof have been determined. In one example embodiment, administrative agents 207 installed on each PC 103 from corporate network 101 or an individual segment thereof may collect information about the productivity index of the Windows operating system, and the PC 103 that is optimum for the role of NAC-PC 104 may be selected on the basis of this information. This approach may accelerate the selection of NAC-PC 104 because there is less information to analyze. The Windows productivity index measures the capabilities of the hardware and software configurations of PCs 103 and presents the measurement as a number called the base productivity index. A higher base productivity index means that a PC 103 will perform better and faster, especially when performing more complex and resource-intensive tasks, than a PC 103 with a lower base productivity index. The index is based on a rating of five basis components, such as the processor, operating memory, graphics, games graphics and the main hard drive, for each of which a separate rating is calculated. Administrative agents 207 installed on each PC 103 from corporate network 302 or an individual segment thereof may initiate the application for a general estimate of the Windows base productivity index and then collect information about the values of the base productivity indices for all the PCs 103 from corporate network 101 or an individual segment thereof. The value of base productivity index is stored on the PC 103 to which the value corresponds. Then, the information will be sent in the same way to analysis and comparison tool 202, which will compare this information with the rules from analytical database 203. Then the total productivity rating will be determined for each PC 103.

In another example embodiment, analysis and comparison tool 202 may select the NAC-PC 104 from multiple PCs 103 from corporate network 101 or an individual segment thereof, based not on rules from analytical database 203, but on the Windows base productivity index value. Analysis and comparison tool 202 may compare Windows base productivity index values collected from all PCs 103 from corporate network 101, select the maximum value, and transfer to management tool 201 information on which PC 103 from corporate network 101 or an individual segment thereof with the maximum Windows base productivity index should be NAC-PC 104. In one example embodiment, analysis and comparison tool 202 may also transfer to administrative agents 207 of each PC 103 information on the number based on the Windows base productivity index via management tool 201.

Figure 2B:
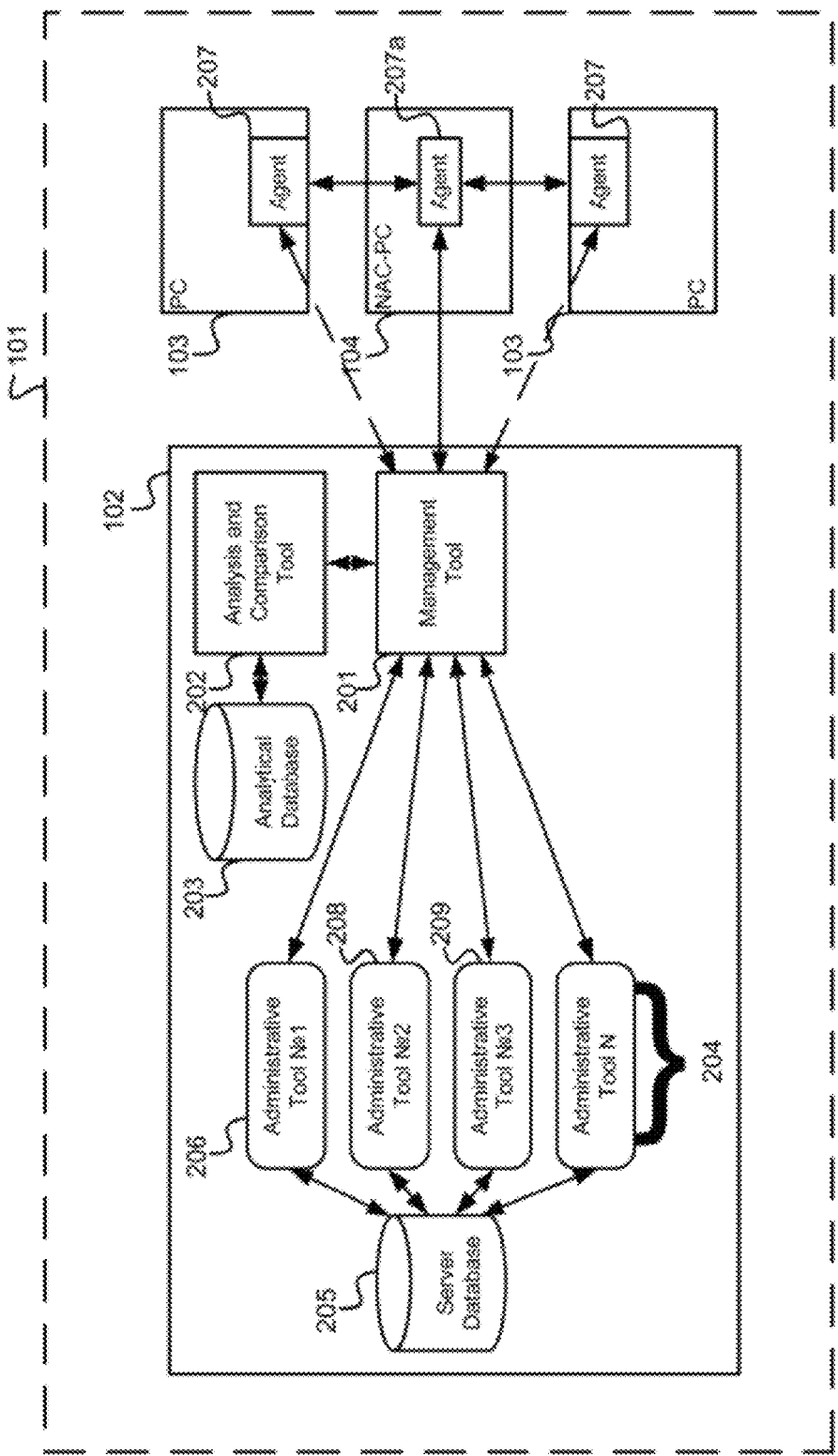
FIG. 2B illustrates a diagram of interaction between the administration server and networked NAC-PC that facilitates access control to the network resources in accordance with one example embodiment.

FIG. 2B depicts one example of interaction of administration server 102, all PCs 103, and NAC-PC 104 within corporate network 101 or an individual segment thereof to control access to the resources of the corporate network.

As stated earlier, Data on the basis of which NAC-PC 104 is identified are collected by administrative agents 207 of each PC 103 from corporate network 302 or an individual segment thereof, and administrative agent 207 of each PC 103 transfers the Data to management tool 201. Management tool 201 in turn transfers the Data to analysis and comparison tool 202 to select the PC 103 that is most suitable for the role of NAC-PC 104. Data collection using administrative agent 207 is initiated by tools for inventorying and determining topology from the series of administrative tools 204. In this system, management tool 201 transfers Data not only to analysis and comparison tool 202, but also to tool 206 and to tool 209 from the series of administrative tools 204 that send the Data to the server database 205. Then these Data may be used by other administrative tools from the series of administrative tools 204. NAC-PC 104 may be used to relay (i.e., transfer on) information in a special case. The Data may be used to control access to the resources of corporate network 101 for any PC 103, including new PC 103*a* on corporate network 101 or an individual segment thereof.

There are two basic steps in controlling access to the resources of corporate network 101. The first step is carried out by administration server 102. A tool from the series of administrative tools 204 is used to carry out these tasks. This tool initiates a comparison of Data collected during inventorying and topology determination that are stored in server database 205 with the set of criteria that define access rules. Access criteria and rules based on those criteria are also stored in database 205. Criteria may include the following attributes:

Membership in a domain;
Set of network addresses;
Device type and identifier;
Presence of an agent on PC 103;
Level of antivirus protection for PC 103;
The type and version of the operating system and the set of installed patches;

The presence or absence of certain applications on PC 103; and

Whether PC 103 is a source of infection.

This set of criteria is an example and does not limit the capabilities of the system in question. Each criterion or group of criteria may define an access rule or policy.

As soon as an access rule or policy is defined for a particular PC 103 from corporate network 101 or an individual segment thereof, it will be transferred to administrative agent 207*a* of NAC-PC 104, which will apply it to the particular PC 103 for which it was intended. While these tasks are in progress, administration server 102, i.e., management tool 201, will have the opportunity to connect with administrative agent 207 of any PC 103 from corporate network 101 or an individual segment thereof to transfer any remote administration tasks.

Figure 5:
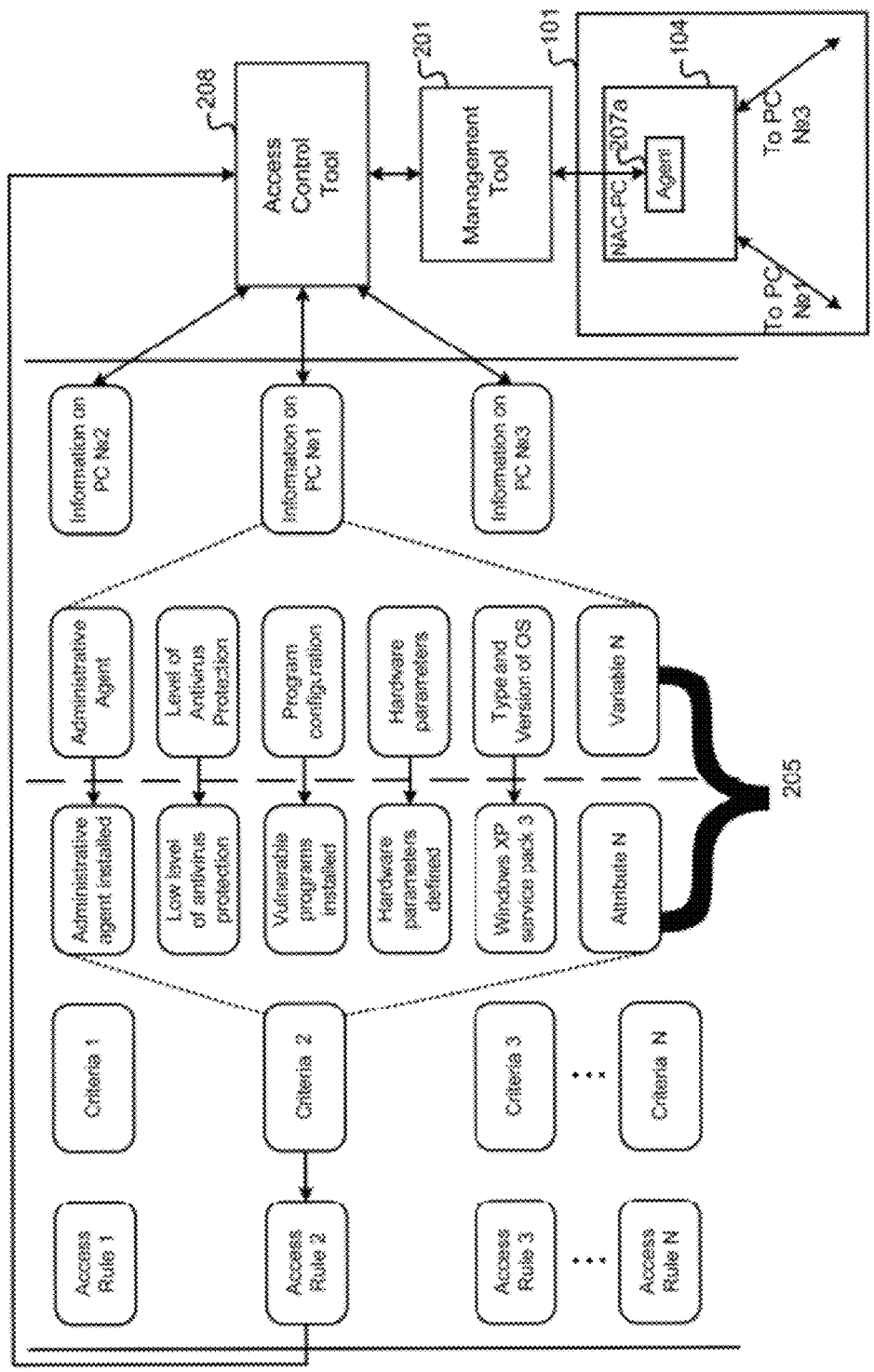
FIG. 5 illustrates a diagram of interaction of the database of the administration server, the access control module and administration module for the purpose of identification of access rules based on results of inventorization and topology of each PC from the corporate network in accordance with one example embodiment.

FIG. 5 depicts an example of the interaction of server database 205, tool 208 for controlling access from the series of administrative tools 204 and management tool 201 for defining the access rules on the basis of inventory and topology determination data for each PC 103 from corporate network 101 or an individual segment thereof. In this example, corporate network 101 or an individual segment thereof contains three PCs 103, one of which is NAC-PC 104 with an administrative agent 207*a* installed on it. As noted previously, Data collected from each PC 103 during inventorying and topology determination, on the basis of which the total productivity rating and, later, NAC-PC 104 are determined, are stored in server database 205. Then, tool 208 to control access from the series of administrative tools in 204 initiates a comparison of Data collected during inventorying and topology determination that are stored in server database 205 with the set of criteria that define access rules. The criteria may include various attributes that correspond to Data collected during inventorying and topology determination. Criteria and access rules based on those criteria are also stored in server database 205. Data for each PC 103 in server database 205 constitute a set of various variables collected from each PC 103 from corporate network 101 or an individual segment thereof. For example, for the first PC 103 server database 205 has variables such as: the presence of an administrative agent, level of antivirus protection, software configuration and hardware parameters, and operating system type and version. The values assigned to these variables, which pertain to Data collected for each PC 103, are attributes predefining a particular criterion. For the first PC 103 of three PCs 103 from corporate network 101 or an individual segment thereof the attributes corresponding to variables pertaining to Data collected for the first PC 103 my include: administrative agent installed, level of antivirus protection low, vulnerable programs installed, Windows XP service pack 3 installed, hardware parameters defined. The attribute "level of antivirus protection low" may mean that the first PC 103 from corporate network 101 either has no antivirus application or the antivirus databases are outdated. In our example, we will assume that this attribute corresponds to a situation in which the first PC 103 has outdated antivirus databases. The attribute "vulnerable programs installed" means that the first PC 103 has some software, which is known to contain a vulnerability that may be exploited by malware. The list of software installed on the first PC 103 is compared with the list of software having vulnerabilities that also is in server database 205 to determine whether vulnerable software has been installed on PC 103. The attribute "hardware parameters" may include a set of data such as MAC address and other hardware identifiers. All these attributes, for example, constitute the second criterion, which in turn defines the second rule. This rule in the example may limit the access of the first PC 103 from corporate network 101 or an individual segment thereof to internal and external resources such as the Internet and block access by the rest of the PCs 103 to the first PC 103. These actions may be taken before the antivirus database is updated, a complete virus scan of that PC 103 is performed, and the vulnerabilities eliminated. Then access control tool 208 will send this rule to management tool 201, which in turn forwards this rule to administrative agent 207*a* of NAC-PC 104. According to the rule administrative agent 207*a* of NAC-PC 104 limits the access of the first PC 103 to internal and external resources such as the Internet and blocks the remaining PCs 103 from accessing the PC 103.

The antivirus database may be updated in different ways. For example, the first PC 103 according to the access rule may be given access to update servers of antivirus application provider, and administrative agent 207*a* of NAC-PC 104 may transfer to administrative agent 207 installed on the first PC 103 information necessary to initialize the antivirus application to download new antivirus databases and roll back to the previous version of the antivirus databases if necessary for correct installation of new databases. These actions may be taken using administrative agent 207*a* of NAC-PC 104, which may transfer downloaded antivirus databases to the first PC 103, administrative agent 207 of which in turn initiates the antivirus application to update the antivirus databases. Then these actions with respect to defining access rules are taken for all the remaining PCs 103 from corporate network 101 or an individual segment thereof except NAC-PC 104. In one example embodiment, the access rule may be sent directly to administrative agent 207 of PC 103 to configure that PC 103 according to the access rule.

Several different criteria may correspond to any access rule. Criteria in turn may consist, as a minimum, of one attribute. A set of identical attributes may correspond to several criteria, which may correspond to one or more access rules.

The search for and repair of vulnerabilities take place in the following way. There is a tool on administration server 102 in the series of administrative tools 204 that is responsible for vulnerability search and repair tasks. This tool compares Data collected during inventorying and topology determination, i.e., information about the program configuration, including the operating system type and version and the set of installed patches, for each PC 103 from server database 205 with information about known vulnerabilities. Information about known vulnerabilities is also found in server database 205 and is continuously updated. If software is installed on any PC 103 from corporate network 101 or an individual segment thereof that contains a vulnerability, and information about that vulnerability in that version of the software is known, the tool responsible for vulnerability search and repair from the series of administrative tools 204 will take actions to repair that vulnerability. These actions may be covering known software vulnerabilities with patches. The tool responsible for vulnerability search and repair from the series of administrative tools 204 may call external resources for information about patches for the vulnerabilities. Patches for known vulnerabilities are then downloaded by the tool responsible for vulnerability search and repair from the series of administrative tools 204 from resources that provide this information to the server database 205. The downloaded patches are now associated with information about known vulnerabilities that also is in server database 205. Then, this tool from the series of administrative tools 204 generates a task to install the patch to repair the vulnerability for any PC 103 from corporate network 101 or an individual segment thereof. Management tool 201, having obtained information from the tool responsible for vulnerability search and repair from the series of administrative tools 204 that the tasks have been generated and the patch is ready to be sent, connects to administrative agent 207 of that PC 103 from corporate network 101 or an individual segment thereof, for which the installation of the patch for the vulnerability found on that PC 103 is intended. The tool responsible for vulnerability search and repair from the series of administrative tools 204 will then send the patch via management tool 201 to the PC 103 from corporate network 101 or an individual segment thereof on which the software containing the vulnerability is installed. Administrative agent 207 of that PC 103 initiates the installation of the patch for the known vulnerability. The tool responsible for vulnerability search and repair from the series of administrative tools 204 also updates information in server database 205 that a patch was installed for the version of the software on that PC 103. In the future, when search and repair of vulnerabilities is required, the tool responsible for vulnerability search and repair tool from the series of administrative tools 204, comparing information about known vulnerabilities with information on software installed on any PC 103, will know whether server database 205 has the patch necessary to repair a vulnerability since, after the patch is downloaded from some resource, it will be associated with information about the known vulnerability that also is in server database 205. If server database 205 has no such patch for a particular vulnerability, information on which is in server database 205, then the tool responsible for vulnerability search and repair from the series of administrative tools 204 will call external resources to download patches.

Another example of the functioning of administration server 102, i.e., of administrative tools from the series of administrative tools 204, is remote software update. The tool responsible for software update tasks from the series of administrative tools 204 may call external resources for information about new versions of software and compare that information with information from server database 205 about the version of some software installed on some PC 103 from corporate network 101 or an individual segment thereof. This information is part of the Data collected during the inventorying of each PC 103 from corporate network 101 or an individual segment thereof and topology determination. If the version of some software on some PC 103 from corporate network 101 or an individual segment thereof is an earlier version, the new version of that software will be downloaded using the responsible tool from the series of administrative tools 204 and placed on the server database 205. Then this tool from the series of administrative tools 204 will generate a task to update the software for some PC 103 from corporate network 101 or an individual segment thereof. Management tool 201, having obtained information from the tool responsible for software updates from the series of administrative tools 204 that these tasks have been generated connects to administrative agent 207 of the PC 103, the software of which must be updated. After this, the tool responsible for software updates will send the necessary update from server database 205 via management tool 201 to the PC 103, the software of which must be updated. Administrative agent 207 of that PC 103 initiates the installation of that software. The tool responsible for software updates from the administrative tools 204 will update the information in server database 205 about the version of the software for the PC 103 that was installed.

One must note that administrative agent 207*a* of NAC-PC 104 from corporate network 101 or an individual segment thereof cannot always respond to attempts to connect to it by administration server 102. Nor can administrative agent 207*a* of NAC-PC 104 always control access to the resources of corporate network 101, search for new PCs 103*a* on corporate network 101 or an individual segment thereof and grant all PCs 103, including and new PCs 103*a*, access to the resources of corporate network 101 according to certain rules or policies. There may be various reasons for this, for example, NAC-PC 104 may be powered down, overloaded, cut off from the Internet and so on. In this case the system provides a mechanism for designating another PC 103 from corporate network 101 or an individual segment thereof for the role of NAC-PC 104 according to one example embodiment. To verify whether NAC-PC 104 is active, administration server 102, i.e., management tool 201, sends queries to administrative agent 207*a* of NAC-PC 104 after a certain time interval. If a response to a query from management tool 201 comes from administrative agent 207*a* of NAC-PC 104, then this means that NAC-PC 104 is active. If there is no response to a query, then it follows that NAC-PC 104 is inactive and a new NAC-PC 104 must be appointed. Queries and responses may be carried out using any known network protocol, for example, UDP or any other.

If no response is received from administrative agent 207*a* of NAC-PC 104 to a query transmitted by management tool 201, then a new NAC-PC 104, selected from the remaining PCs 103 from corporate network 101 or an individual segment thereof will be designated. Management tool 201 initiates analysis and comparison tool 202 to select the second according to the productivity rating PC 103 from corporate network 101 or an individual segment thereof. Analysis and comparison tool 202 will select the value among the total productivity ratings for each PC 103 from analytical database 203 that corresponds to the second highest value of the total productivity rating and transfer to management tool 201 information about the PC 103 to which the second highest total productivity rating belongs. This information may be an identifier such as the network address of the given PC 103. The network address of the given PC 103 is presented to management tool 201. Administration server 102, i.e., management tool 201, connects to administrative agent 207 of this PC 103 and informs it about the status of NAC-PC 104. Then control of access to the resources of corporate network 101, the search for new PCs 103*a* on corporate network 101 or an individual segment thereof, and the granting of access to the resources of corporate network 101 to all PC 103, including new PC 103*a*, according to certain network access rules or policies will be carried out using administrative agent 207*a* of new NAC-PC 104. When administrative agent 207 of the PC 103 that was previously NAC-PC 104, begins to respond to the queries of administration server 102, the function of NAC-PC 104 may be switch back to it according to one example embodiment.

Controlling access to the resources of corporate network 101 or an individual segment thereof is vital for new PCs 103*a* recently connected to corporate network 101. For this purpose administrative agent 207*a* installed on NAC-PC 104, which controls access to the resources of corporate network 101, is configured first and foremost to detect a new PC 103*a*. To do this, administrative agent 102*a* installed on NAC-PC 104 may listen/intercept broadcast queries, for example ARP requests and notifications according to one example embodiment.

Figure 6:
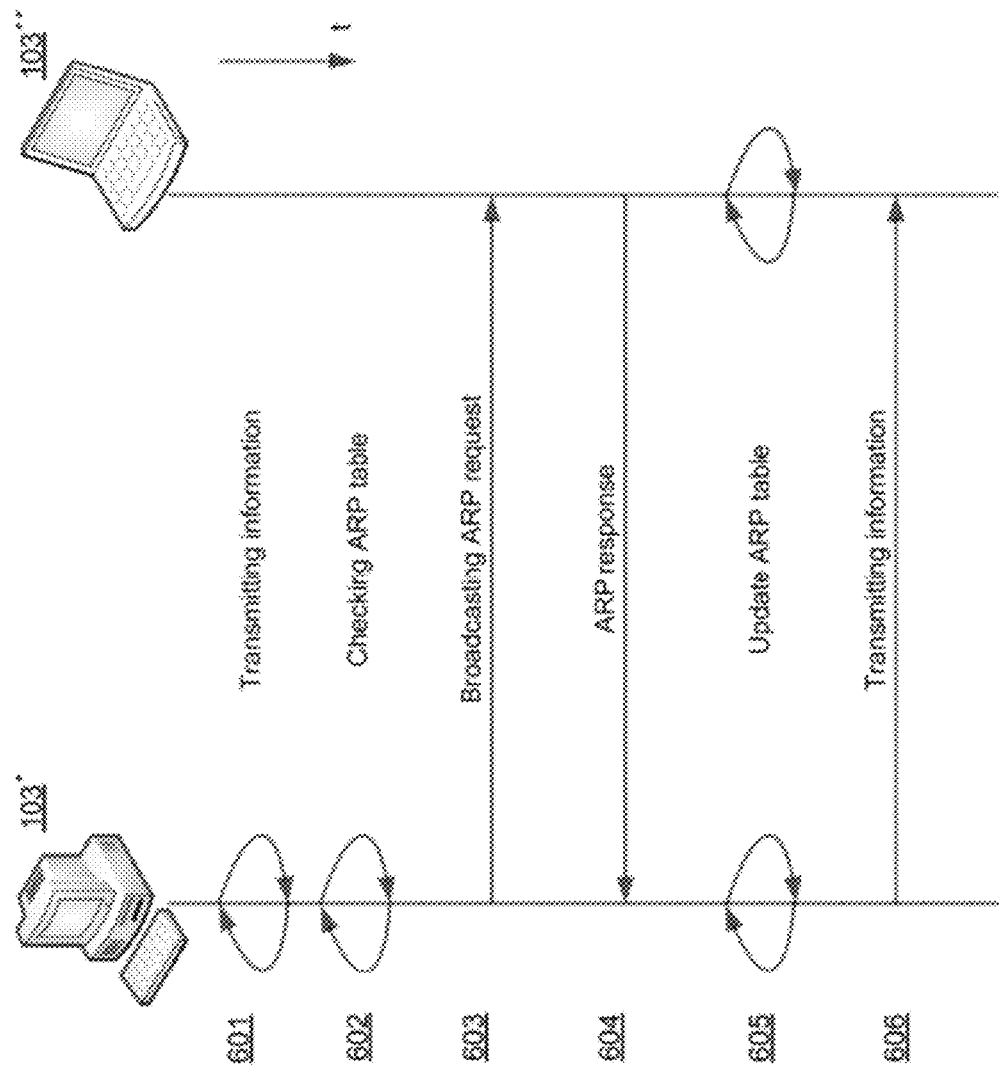
FIG. 6 illustrates a diagram of interaction of two PCs from the corporate network using ARP requests in accordance with one example embodiment.

FIG. 6 depicts the mechanism for the interaction of two PCs 103 (for convenience referred hereinafter as 103' and 103") from a corporate network or an individual segment thereof using ARP requests, ARP (Address Resolution Protocol) is a low-level protocol used in computer networks and is intended for identifying a MAC address on the basis of a known IP address. When, for example, first PC 103' wants to communicate with and perform a data transmission to a second PC 103" with IP address 192.168.0.1, before transmitting that data it calls the ARP table, which is a table of correspondence between IP and MAC addresses, if no information has ever been sent to address 192.168.0.1, then the ARP table will lack the appropriate entry. One must therefore determine which MAC address corresponds to the given IP address. An ARP request is used specifically for these purposes.

At step 601, first PC 103' wants to communicate with second PC 103" and transfer information to it. The IP address of second PC 103" is unknown. Transfer of information may be initiated by some software installed on first PC 103' or by the operating system installed on first PC 103'. Then at step 602, a call to the ARP table is made to determine a match between the IP and MAC addresses of the second PC 103", which is the recipient of the data transmission, if no match is found at step 602, that is the ARP table does not contain a MAC address of second PC 103" to which the IP address corresponds, then at step 603 first PC 103' sends corporate network 101 or an individual segment thereof a broadcast ARP request. Each PC 103 from corporate network 101 or an individual segment thereof will receive the query with the sought after IP address and the IP and MAC addresses of the sender—first PC 103'—embedded in it. All PCs 103 on corporate network 101 or an individual segment thereof will receive this query, but at step 604 only the PC 103 whose IP matches the one requested will respond. In the present case, second PC 103" responds to the ARP request. The ARP response contains the MAC address of second PC 103", and subsequently all traffic addressed to the IP address of second PC 103" for certain comes to second PC 103", since the MAC address of that PC 103" will be known to first PC 103'. At step 605, the ARP tables on first PC 103', which is the sender of the ARP request, and second PC 103", which is the recipient of the ARP request, are updated and the correspondence of the IP and MAC addresses is established. At step 606, the information is transferred to second PC 103".

As stated earlier, administrative agent 207a of NAC-PC 104 listens and intercepts broadcast queries, for example, ARP requests and notifications. A new PC 103a connected to corporate network 101 or to an individual segment thereof, after connection and receipt of an IP address, sends the segment a broadcast ARP announcement—a special ARP request to update the ARP tables of the rest of the PCs 103 on corporate network 101 or an individual segment thereof. Administrative agent 207a of NAC-PC 104 receives the ARP announcement from new PC 103a on corporate network 101 or an individual segment thereof and checks its own ARP table. If the IP and MAC addresses indicated in the query are not in the table, then administrative agent 207a of NAC-PC 104 writes these addresses in the ARP table, noting that the given PC 103a on corporate network 101 or an individual segment thereof is new and not configured according to rules for access to the resources of corporate network 101. The next time when that new PC 103a on corporate network 101 or an individual segment thereof, using any application or operating system, has to send information to a PC 103 from corporate network 101 or an individual segment thereof with a known IP address and unknown MAC address, it will send a broadcast ARP request to corporate network 101 or an individual segment thereof to identify the MAC address of the PC 103 that is the recipient of any information.

Figure 7:
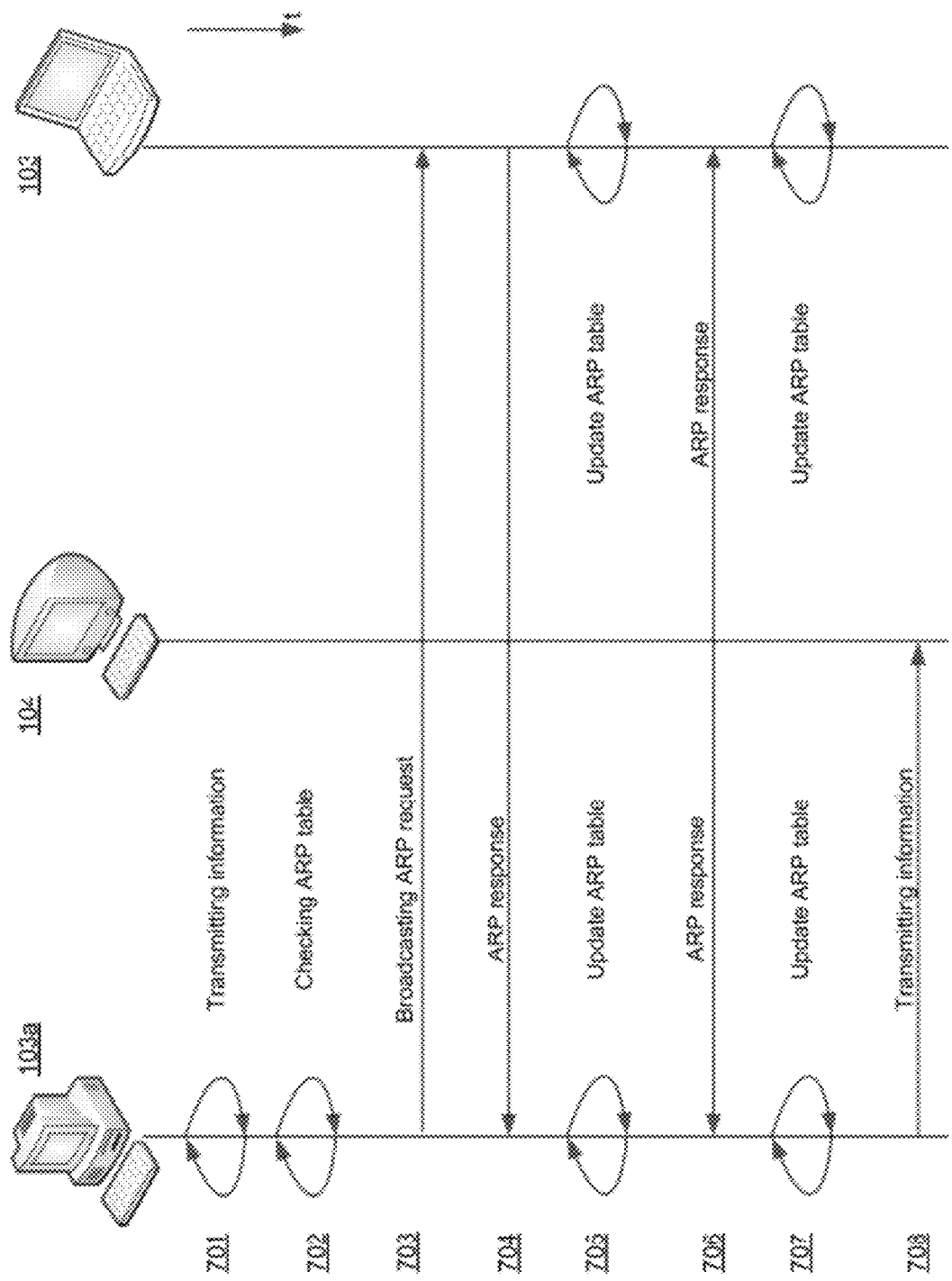
FIG. 7 illustrate a diagram of intervention of NAC-PC into the interaction of any PC and a new PC in the corporate network using ARP requests for the purpose of establishing compliance of the new PC with the access rules in accordance with one example embodiment.

FIG. 7 depicts an example embodiment of the mechanism by which NAC-PC 104 intervenes in the interaction of some PC 103 and a new PC 103a from corporate network 101 or an individual segment thereof using ARP requests to ensure that a new PC 103a on corporate network 101 or an individual segment thereof conforms to network access rules. At step 701, new PC 103a wants to communicate with PC 103 and perform data transmission. The IP address of this PC 103 is unknown. The transfer of traffic, i.e., a data transmission, may be initiated by some software installed on the new PC 103a or by the operating system of the new PC 103a. Then at step 702, a call is made on new PC 103a to the ARP table to determine the existence of a match between the IP and MAC addresses of the PC 103 that is the recipient of the data. If no match is found at step 702, then the ARP table does not have the MAC address of the PC 103 to which the IP address corresponds and to which the information is addressed, and then at step 703 new PC 103a sends corporate network 101 or an individual segment thereof a broadcast ARP request. That is, every PC 103 from corporate network 101 or an individual segment thereof will receive a query with the IP address of the sought after PC 103 and the IP and MAC addresses of the sender, i.e., new PC 103a, embedded in it. Then administrative agent 207a of NAC-PC 104, listening for ARP requests on corporate network 101 or an individual segment thereof, will also receive the ARP request and see that new PC 103a wants to transmit data to a certain PC 103, after which administrative agent 207a of NAC-PC 104 will be ready to redirect traffic, i.e., the data transmission, from new PC 103a to itself or another destination. At step 704, the ARP request will also be received by the PC 103 that has the IP address that was indicated in the ARP request of the new PC 103a. PC 103 compares the IP address in the ARP request and its own IP address, detects a match, and sends an ARP response to the ARP request stating the IP and MAC addresses of PC 103. Then at step 705, the ARP tables of the new PC 103a that sent the ARP request, and PC 103 that received the ARP request will be updated and a match between the IP and MAC addresses will be obtained. At step 706, administrative agent 207a of NAC-PC 104 must redirect traffic from new PC 103a to itself or to another destination to ensure that new PC 103a on corporate network 101 or an individual segment thereof conforms to access rules. In some time after administrative agent 207a of NAC-PC 104 receives the ARP request and sees that new PC 103a wants to transmit data to some PC 103, administrative agent 207a of NAC-PC 104 will send the PC 103a that sent the ARP request a new ARP response indicating the IP address of the PC 103 for which the initial ARP request was intended and the MAC address of NAC-PC 104 or another destination. Administrative agent 207a of NAC-PC 104 will also send PC 103 an ARP response indicating the IP address of the new PC 103a that sent the initial ARP request and the MAC address of NAC-PC 104 or another destination. On the time scale, these actions take place after the update of the ARP table of the new PC 103a that sent the ARP request and the PC 103 that received the ARP request. By these actions administrative agent 207a of NAC-PC 104 "poisons" the ARP tables of the PC 103a that was the initial sender of the ARP request and the PC 103 that was the initial recipient of the ARP request. At step 707, the ARP tables of the new PC 103a that initially sent the ARP request and the PC 103 that initially received the ARP request will be updated. In this way, at step 708, traffic from a new PC 103a will be sent to NAC-PC 104 or to another destination, i.e., its traffic thereafter will always be redirected not to the PC 103 to which the IP address belongs, but to NAC-PC 104 or another destination. On attempts to transmit data to new PC 103a, the PC 103 that initially received the ARP request in turn will send them according to the ARP table to NAC-PC 104 or another destination. The other destination may be, for example, an HTTP server intended to ensure that a new PC 103a on corporate network 101 or an individual segment thereof conforms to network access rules or policies.

Figure 8:
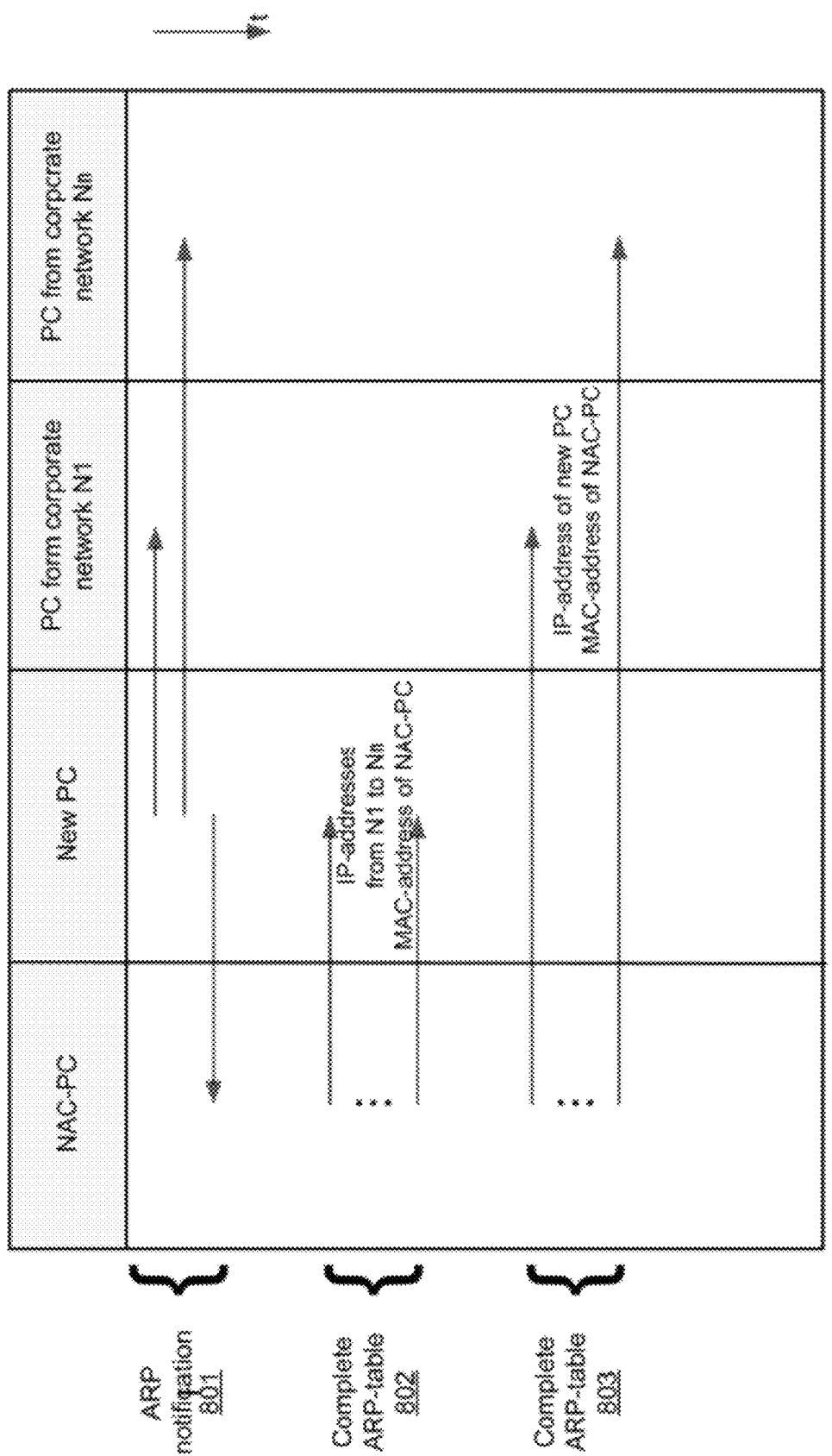
FIG. 8 illustrates one example of intervention of NAC-PC into the interaction of any PC and a new PC in the corporate network using ARP requests for the purpose of establishing compliance of the new PC with the access rules in accordance with one example embodiment.

FIG. 8 depicts a one example embodiment of the mechanism by which NAC-PC 104 intervenes in the interaction of some PC 103 and new PC 103*a* from corporate network 101 or an individual segment thereof using ARP requests to ensure that a new PC 103*a* on corporate network 101 or an individual segment thereof conforms to access rules. At step 801, new PC 103*a* connected to corporate network 101 or an individual segment thereof will send all PCs 103 and NAC-PC 104 a broadcast ARP announce message, in which new PC 103*a* announces its IP and MAC addresses. Each PC 103 will update its ARP table. Administrative agent 207*a* of NAC-PC 104, having received the ARP-notification from PC 103*a*, records the addresses of that PC 103*a* in its table, noting that new PC 103*a* on corporate network 101 or an individual segment thereof is new and not configured according to rules for access to the resources of corporate network 101. Then at step 802, administrative agent 207*a* of NAC-PC 104, without receiving ARP requests, sends the new PC 103*a* ARP responses, and there will be as many of these responses as there are PCs 103 on corporate network 101 or an individual segment thereof. ARP responses sent by administrative agent 207*a* of NAC-PC 104 will contain the MAC address of NAC-PC 104 or another destination and the IP address of one of PCs 103 belonging to corporate network 101 or an individual segment thereof. In this way, administrative agent 207*a* of NAC-PC 104, with the help of N ARP responses, where N is the number of PCs 103 on corporate network 101 or an individual segment thereof, generates a complete ARP table for new PC 103*a*. The ARP table will be generated in such a manner that, no matter where new PC 103*a* transmits data, it will send it to NAC-PC 104 or another destination. At step 803, administrative agent 207*a* of NAC-PC 104, without receiving ARP requests, sends N PCs 103, where N is the number of PCs 103 in a segment, ARP responses indicating the IP address of new PC 103*a* on corporate network 101 or an individual segment thereof and the MAC address of NAC-PC 104 or another destination. In this way, if some PC 103 will transmit data to new PC 103*a*, that traffic will go to NAC-PC 104 or another destination. That is, any interaction of some PC 103 from corporate network 101 or an individual segment thereof with a new PC 103*a* will be limited until that new PC 103*a* on corporate network 101 or an individual segment thereof is checked for conformance to network access rules or policies.

After traffic from new PC 103*a* has been redirected to NAC-PC 104 or another destination, that new PC 103*a* on corporate network 101 or an individual segment thereof is checked for conformance to network access rules or policies.

Figure 2C:
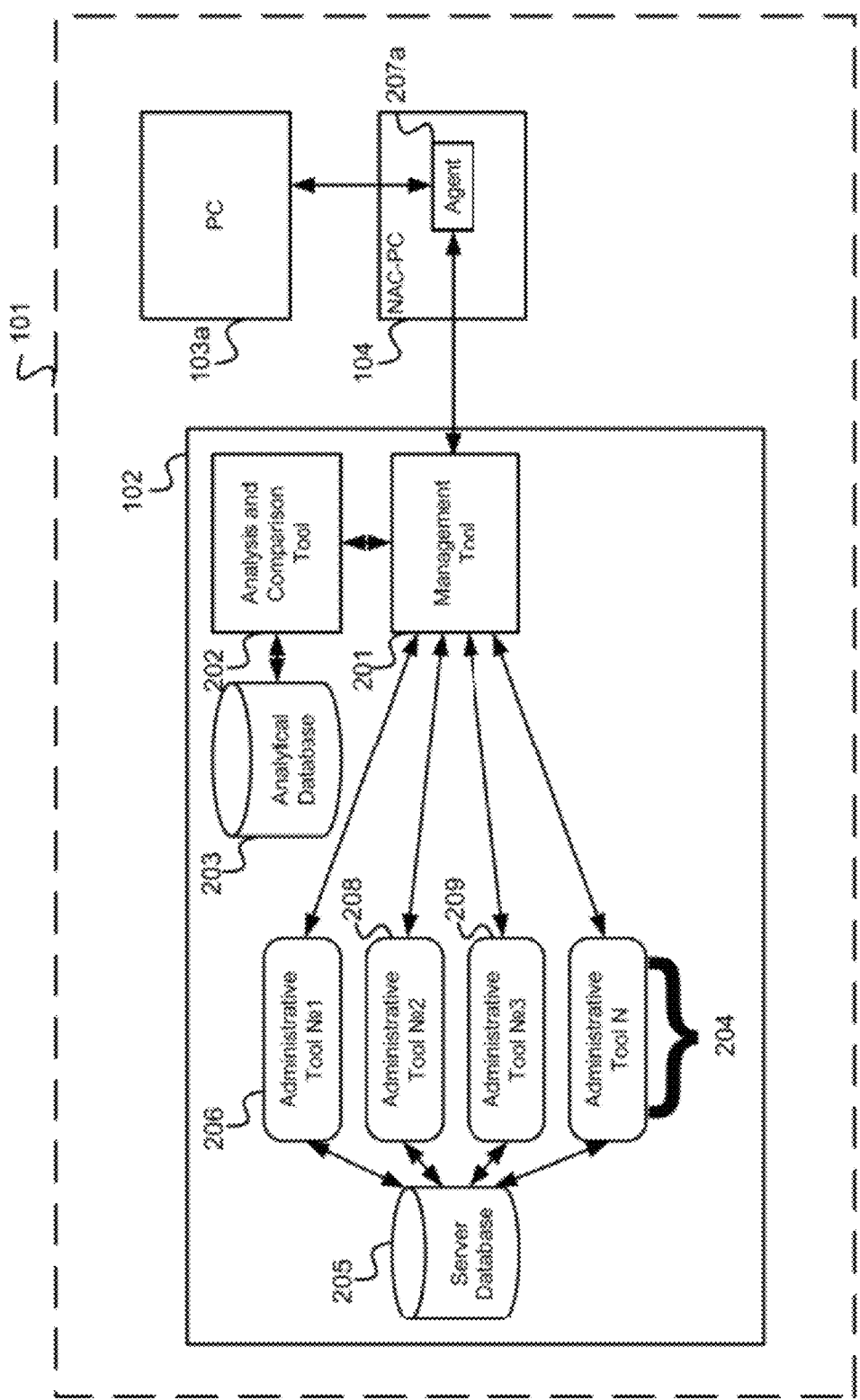
FIG. 2C illustrates a diagram of interaction between the administration server, new PC and NAC-PC that facilitates access control to the network resources in accordance with one example embodiment.

FIG. 2C depicts a flow diagram for detailed interaction of administration server 102, new PC 103*a* and NAC-PC 104 within corporate network 101 or an individual segment thereof.

As noted previously, administrative agent 207*a* of NAC-PC 104 detects a new PC 103*a* on corporate network 101 or an individual segment thereof on the basis of an ARP notification. Then administrative agent 207*a* of NAC-PC 104 redirects traffic from new PC 103*a* to NAC-PC 104 by one of the methods described above, without allowing new PC 103*a* to transmit data to any PC 103, while administrative agent 207*a* NAC-PC 104 does not allow the rest of the PCs 103 from corporate network 101 or an individual segment thereof to transmit data to new PC 103*a*. After traffic is redirected from new PC 103*a*, the user of new PC 103*a* from corporate network 101 or an individual segment thereof may enter only the Internet page offered by administrative agent 207*a* of NAC-PC 104. As soon as a user on new PC 103*a* from corporate network 101 or an individual segment thereof opens an Internet browser, administrative agent 207*a* of NAC-PC 104 will provide an Internet page and begin remotely to collect basic information about new PC 103*a*. At the initial stage of the operation of this system this information is collected by administrative agents 207 of each PC 103 during inventorying. Administrative agent 207 is not installed on new PC 103*a*. In this case administrative agent 207*a* of NAC-PC 104 collects the basic information via the Internet page, i.e., for example, using ActiveX technology. For example, after opening an Internet browser on new PC 103*a* from corporate network 101 or individual segment thereof and entering the Internet page offered by administrative agent 207*a* of NAC-PC 104, to which traffic from new PC 103*a* was redirected, the user of that new PC 103*a* automatically downloads the ActiveX component that will collect the set of data about new PC 103*a*. This set of data may be similar to the Data collected by administrative agents 207 of each PC 103 during inventorying. Then this set of data pertaining to new PC 103*a* collected using the ActiveX component will be sent to administrative agent 207*a* of NAC-PC 104 and from it to administration server 102, i.e., to management tool 201. Since the collected data set pertains to the inventorying of new PC 103*a*, the tool 206 from the series of administrative tools 204 that is responsible for inventory tasks will place this data in the server database 205. Then, access control tool 208 from the series of administrative tools 204 initiates a comparison of the data set collected from new PC 103*a*, saved in the server database 205 with the set of criteria that define network access rules. Then the access rule or rules for criteria defined using the attributes that are the data set collected from new PC 103*a* will be selected. Access control tool 208 from the series of administrative tools 204 will send this rule or rules to management tool 201, which in turn will send this rule to administrative agent 207*a* of NAC-PC 104, which will apply that rule to new PC 103*a*. As soon as the access rule is applied to new PC 103*a* on corporate network 101 or an individual segment thereof, administrative agent 207*a* of NAC-PC 104 will update the ARP tables of new PC 103*a* and the rest of PCs 103 on corporate network 101 or an individual segment thereof with the correct, matching IP and MAC addresses. In another embodiment, after access rules have been applied to the new PC 103*a*, NAC-PC 104 may transmit ARP response messages to the PC 103*a*. The number of ARP response messages may correspond to the number of computers in the network to which access by said computer is allowed. Each ARP response message may contain an IP address and MAC address of PC 103 to which access by new PC 103*a* is allowed. In addition, NAC-PC 104 may send ARP response messages to the PCs 103 to which access by new PC 103*a* is allowed. These ARP response message will contain IP and MAC addresses of new PC 103*a*. Administrative agent 207 may also be installed on new PC 103*a* using a tool intended for these actions from the series of administrative tools 204 and management tool 201.

In a special case actions to apply access rules for new PC 103*a* on corporate network or an individual segment thereof may be taken using only NAC-PC 104 and its administrative agent 207*a*. Access control tool 208 from the series of administrative tools 204 may send all access rules and criteria from the server database 205 locally to NAC-PC 104. Then the data set pertaining to new PC 103*a* may be sent using the ActiveX component to NAC-PC 104 for local definition of the necessary access rule and application of that rule to new PC 103*a*.

In one example embodiment, traffic from new PC 103*a* may be redirected to another destination that is intended to check the new PC 103a on corporate network 101 or an individual segment thereof for conformance to the access rules. Another destination might be, for example, an HTTP server, which is necessary to define a particular access policy for the new PC 103a. It is its MAC address that administrative agent 207a of NAC-PC 104 may indicate in ARP responses to generate the ARP table of new PC 103a and redirect traffic from new PC 103a. This other destination may also collect basic information about new PC 103a through an Internet page, i.e., for example, using ActiveX technology, and transfer it to administration server 102, i.e., to management tool 201, to define the access rule for that new PC 103a.

In another example embodiment, traffic from new PC 103a may be redirected to NAC-PC 104, and, as soon as a user on new PC 103a from corporate network 101 or an individual segment thereof opens an Internet browser, administrative agent 207a of NAC-PC 104 will redirect traffic from that new PC 103a to another destination, such as an HTTP-server.

One must note that, if corporate network 101 or an individual segment is expanded by adding a new PC 103a, a situation may arise in which the new PC 103a added to corporate network 101 or an individual segment thereof will have a more powerful configuration than NAC-PC 104. The system for controlling access to the resources of corporate network for personal computers is therefore provided with a mechanism to determine the total productivity rating of new PC 103a from corporate network 101 or an individual segment thereof. As stated earlier, when a new PC 103a is found, traffic will be redirected to NAC-PC 104 using administrative agent 207a of NAC-PC 104, and then an ActiveX component will collect the set of data from new PC 103a. This data set will then be sent to administration server 102, i.e., to management tool 201, for further definition of access rules for new PC 103a. As soon as an access rule is defined and applied to new PC 103a on corporate network 101 or an individual segment thereof, administrative agent 207a of NAC-PC 104 updates the ARP tables of new PC 103a and the rest of the PCs 103 on corporate network 101 or an individual segment thereof with the correct, matching IP and MAC addresses. Administrative agent 207 will also be installed on that new PC 103a using the tool intended for these actions from the series of administrative tools 204 and management tool 201. Then administrative agent 207, inventory tool 206, and topology determination tool 209 will be used to collect Data necessary to determine the total productivity rating of new PC 103a from corporate network 101 or an individual segment thereof. The Data will be sent by management tool 201 to analysis and comparison tool 202. Then one of the methods described above will be used to calculate the total productivity rating and determine the rank according to the productivity rating of that new PC 103a. Information about the total productivity rating of new PC 103a and its rank according to the productivity rating will be added to analytical database 203, thereby updating information on the ranks according to the productivity rating of all PCs 103 from corporate network 101 or an individual segment thereof that is saved there. If new PC 103a has a total productivity rating higher than that of the current NAC-PC 104, then that new PC 103a will be designated as the new NAC-PC 104. Information will be sent to administrative agent 207a of the old NAC-PC 104 that it will no longer perform its functions using a tool intended for this from the series of administrative tools 204 and management tool 201. By contrast, administrative agent 207 of new PC 103a will be sent information about the new functions using a tool intended for this from the series of administrative tools 204 and management tool 201.

In one example embodiment, the set of data collected using the ActiveX component may be used to determine the total productivity rating of new PC 103a.

Access to the resources of corporate network 101 or an individual segment thereof is controlled using administrative agent 207a of NAC-PC 104, including interaction with the antivirus application installed on each PC 103 on corporate network 101 or an individual segment thereof. The PC 103 on corporate network 101 or an individual segment thereof may be infected by malware. It is therefore possible for the infection to spread to all PCs 103 on corporate network 101 or an individual segment thereof. For this reason the system for controlling access to the resources of corporate network for personal computers is provided with a mechanism to cut off any suspect PC 103 from resources on corporate network 101 or otherwise limit access by suspect PC 103 to the resources of the corporate network 101. PC 103 with limited network access may have access to some network devices or services, such as network printers or faxes, but not to other resources, such as document servers.

One example of the operation of the system for controlling access to the resources of corporate network for personal computers in this area may be the disconnection of a PC 103 that is a spreader of an unknown executable program code from corporate network 101 or an individual segment thereof. As noted previously, administrative agent 207 is installed on each PC 103 on corporate network 101 or an individual segment thereof. In addition to collecting Data during inventorying and topology determination, administrative agent 207 may also track the appearance of files with executable program code on the hard drive of a given PC 103, to which public access has been given to all PC 103 on corporate network 101 or an individual segment thereof. Then administrative agent 207 of the PC 103, on the hard drive of which a file with executable program code has appeared, transfers information about this to administration server 102, i.e., to management tool 201. Management tool 201 will transfer this information to access control tool 208 from the series of administrative tools 204. This information might include the name of the file with the executable program code, the size of that file, and the network address of the PC 103 that placed the file with executable program code on the hard drive of another PC 103. This set of parameters is an example, and information collected about the file with executable program code may contain other parameters as well. Access control tool 208 from the series of administrative tools 204 may save this information in server database 205. If, for example, it is later discovered that the same file with executable program code was copied to more than N PCs 103 on corporate network 101 or an individual segment thereof, then access control tool 208 from the series of administrative tools 204 may, via management tool 201, send administrative agent 207a of NAC-PC 104 a command to disconnect PC 103, which is spreading the file with executable program code, from corporate network 101 or an individual segment thereof. In one example embodiment, the administrative agent 207 may activate an antivirus application to perform an antivirus scan of the file with executable program code on PC 103. If, for example, the antivirus scan shows that the file with executable program code is malicious, the antivirus application will delete the file and report that the file with executable program code is malicious to administrative agent 207 of the given PC 103, which in turn will transfer this information to administration server 102 for further action or directly to administrative agent 207a of NAC-PC 104 to disconnect the PC 103 that is the spreader of the file with executable program code from corporate network 101 or an individual segment thereof. The antivirus application may also report that the file with executable program code is malicious directly to administrative agent 207a of NAC-PC 104. PC 103, which is the spreader of the file with malicious executable program code, disconnected from corporate network 101 or an individual segment thereof, is thoroughly scanned and, if necessary, repaired. If the antivirus scan showed that the file with executable program code is not malicious, then the approach described above is used, i.e., information collection. And if the file with executable program code is copied to more than N PCs 103 from corporate network 101 or an individual segment thereof, the PC 103, which is the spreader of that file, may be disconnected from corporate network 101 or an individual segment thereof.

The approach may be the same if a network attack is detected. If the antivirus application on PC 103 on corporate network 101 or an individual segment thereof detects a network attack on the part of another PC 103, then information about it is transferred to administrative agent 207 of the PC 103 under attack, which in turn will transfer that information to administration server 102, i.e., to management tool 201. Management tool 201 will transfer this information to access control tool 208 from the series of administrative tools 204. This information might include the network address of the attacking PC 103 and any information about the attack. Access control tool 208 from the series of administrative tools 204 may save this information in server database 205. If, for example, it is later discovered that the same PC 103 carried out an attack aimed at N PCs 103, then access control tool 208 from the series of administrative tools 204 may, via management tool 201, send administrative agent 207a of NAC-PC 104 a command to disconnect the PC 103 that attacked the other PCs 103 on corporate network 101 or an individual segment thereof.

Administrative agent 207, which is installed on every PC 103 on corporate network 101 or an individual segment thereof, may also track the status of applications currently running, including the antivirus application. For example, administrative agent 207 may track whether the antivirus application was turned off correctly. Administrative agent 207 also collects information about recent files scanned by the antivirus application that recently appeared on a PC 103, and, for example, information about files currently being executed on a PC 103. If the antivirus protection was incorrectly turned off, then administrative agent 207 transfers this information to administration server 102, i.e., to management tool 201. Management tool 201 will transfer this information to access control tool 208 from the series of administrative tools 204. Access control tool 208 from the series of administrative tools 204 may save this information in server database 205. When a certain threshold is reached with respect to the number of PCs 103 on which the antivirus protection was incorrectly turned off, access control tool 208 from the series of administrative tools 204 will, via management tool 201, send administrative agent 207a of NAC-PC 104 a command to disconnect the PCs 103 on which the antivirus protection was incorrectly turned off. Access control tool 208 from the series of administrative tools 204 also analyzes information obtained from administrative agents 207 of those PC 103 on which the antivirus protection was incorrectly turned off. If something in common is traced in the information collected from each PC 103, for example, the antivirus application was turned off right after the appearance of some identical files, or identical files were executed on those PCs 103, then those files will be considered suspect. Through management tool 201 access control tool 208 from the series of administrative tools 204 transfers data on suspect files and actions that must be taken if those files are found on PCs 103 to administrative agents 207 of all PCs 103 from corporate network 101. An example of these actions might be the blocking of the launch of a particular file.

Figure 9:
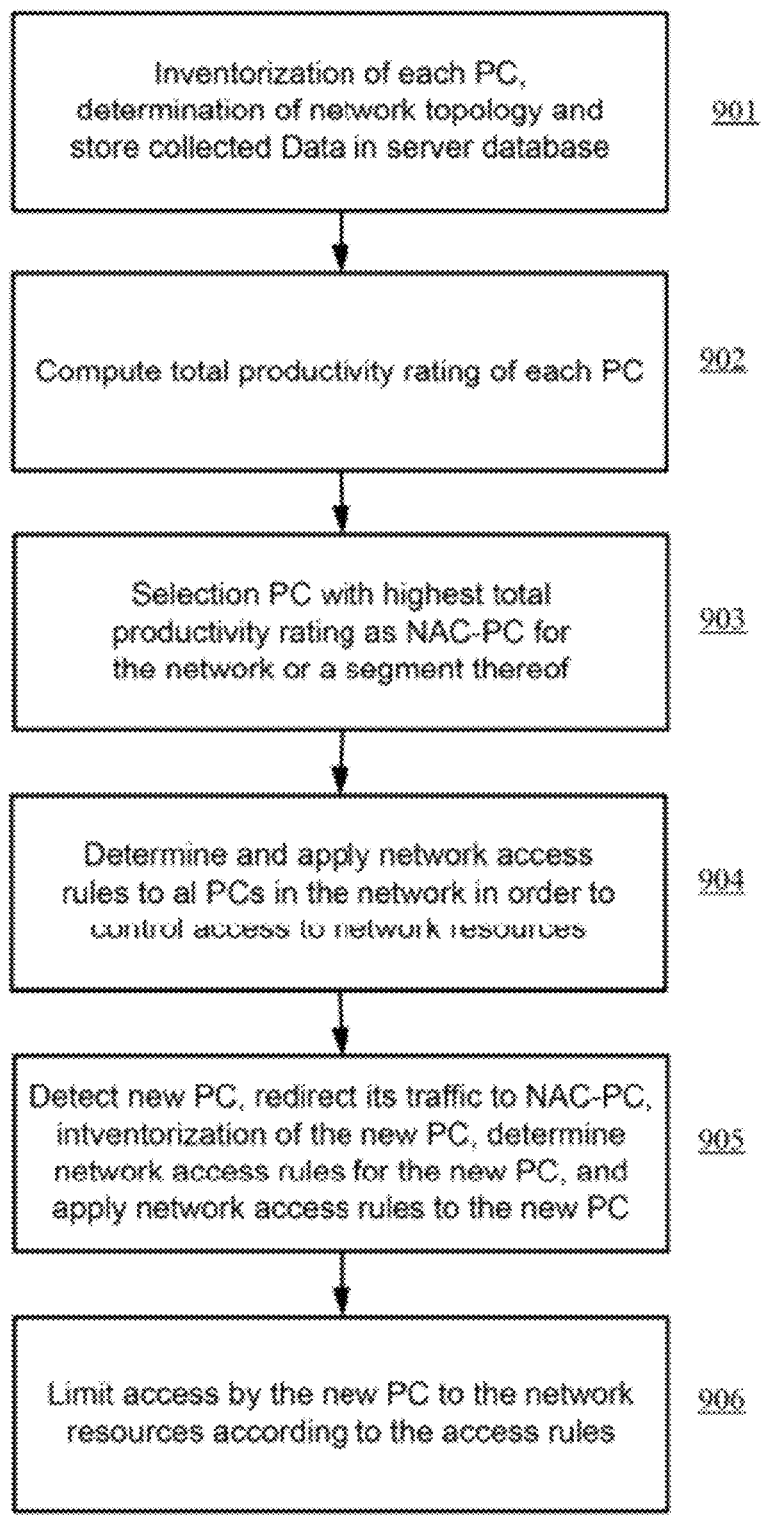
FIG. 9 illustrates an example algorithm of a method for controlling access to the resources of a corporate network in accordance with one example embodiment.

FIG. 9 depicts one example embodiment of an algorithm for the method for controlling access to the resources of corporate network for personal computers.

At step 901, inventory tool 206 from the series of administrative tools 204 is used to generate the task to inventory all PCs 103 from corporate network 101 or an individual segment thereof. Also, topology determination tool 209 from the series of administrative tools 204 is used to generate the task to determine the topology of corporate network 101 or an individual segment thereof. Management tool 201, having obtained information from inventory tool 206 and topology determination tool 209 from the series of administrative tools 204 that these tasks have been generated for all PCs 103, will establish a connection with administrative agents 207 of all PCs 103 from corporate network 101 or an individual segment thereof and will transfer task data. Then administrative agents 207 of each PC 103 from corporate network 101 or an individual segment thereof will collect Data about the PC 103 on which they are installed. After the Data have been collected by administrative agents 207 of each PC 103 from corporate network 101, administrative agent 207 of each specific PC 103 transfers the Data to management tool 201. Management tool 201 in turn transfers the Data to analysis and comparison tool 202 and to inventory tool 206 and topology determination tool 209 from the series of administrative tools 204, which will send the Data to server database 205.

At step 902, analysis and comparison tool 202 compares the Data with information from analytical database 203 and selects the rule corresponding to each variable. Analytical database 203 contains rules to determine the productivity rating of each PC 103 from corporate network 101 or an individual segment thereof. Rules for all variables may be based both on crisp and on fuzzy logic. Having obtained data about all ratings based on rules from analytical database 203, analysis and comparison tool 202 sums the ratings belonging to each PC 103, obtaining the total productivity rating for each PC 103.

At step 903, analysis and comparison tool 202 compares the total productivity ratings and selects the PC 103, whose total productivity rating is the highest and designates it as NAC-PC 104. Management tool 201 transfers information about the new status of that PC 103, i.e., the status as NAC-PC 104, to administrative agent 207 of that PC 103 from corporate network 101 or an individual segment thereof that was selected as NAC-PC 104. Then management tool 201 will connect to administrative agent 207a of NAC-PC 104 to perform tasks to control access to the resources of the corporate network.

At step 904, access rules are determined and applied to all PCs 103 from corporate network 101 or an individual segment thereof. Tool 208 from the series of administrative tools 204 is intended to perform these tasks. Data collected from each PC 103 during inventorying and topology determination, on the basis of which the total productivity rating and, later, NAC-PC 104 are determined, are stored in server database 205. Then access control tool 208 from the series of administrative tools 204 initiates a comparison of Data collected during inventorying and topology determination that are stored in server database 205 with the set of criteria defining access rules. The criteria and access rules based on those criteria are also stored in server database 205. Criteria might include various attributes that correspond to the Data collected during inventorying and topology determination. The data for each PC 103 in server database 205 constitute a set of different variables collected for each PC 103 from corporate network 101 or an individual segment thereof. The values for these variables, pertaining to the Data collected for each PC 103, are attributes that predefine a particular criterion. Criteria, as noted previously, define the access rules. Then access control tool 208 will send the access rule to management tool 201, which in turn will send that rule to administrative agent 207a of NAC-PC 104. Administrative agent 207a of NAC-PC 104 will apply that access rule to the PC for which that rule was defined. This procedure will be carried out for all PCs 103 on corporate network 101 or an individual segment thereof.

At step 905, administrative agent 207a of NAC-PC 104 detects a new PC 103a on corporate network 101 or an individual segment thereof on the basis of, for example, an intercepted ARP notification. Administrative agent 207a of NAC-PC 104 also redirects traffic from new PC 103a. This may take place as follows. New PC 103a, connected to corporate network 101 or an individual segment thereof, sends all PCs 103 and NAC-PC 104 a broadcast ARP notification in which new PC 103a announces its IP and MAC addresses. Administrative agent 207a of NAC-PC 104 therefore detects the new PC 103a on corporate network 101 or an individual segment thereof. Then new PC 103a wants to communicate with some PC 103 and transmit data. The IP address of PC 103 is known. The transfer of traffic, i.e., a data transmission, may be initiated by some software installed on new PC 103a software or the operating system, installed on new PC 103a. Then there is a call on new PC 103a to the ARP table to determine the existence of a match between the IP and MAC addresses of PC 103 that is the recipient of the information. If no match is found, i.e., the ARP table does not have the MAC address of the PC 103 to which the IP address corresponds and to which information as sent, then new PC 103a sends corporate network 101 or an individual segment thereof a broadcast ARP request. That is, each PC 103 from corporate network 101 or an individual segment thereof will receive a query with the IP address of the sought after PC 103, and the IP and MAC addresses of the sender, i.e., new PC 103a, embedded in it. Then administrative agent 207a of NAC-PC 104, listening for ARP requests on corporate network 101 or an individual segment thereof, will also receive the ARP request and will see that new PC 103a wants to transmit data to some PC 103, after which administrative agent 207a of NAC-PC 104 will be ready to redirect traffic, i.e., a data transmission, from new PC 103a to NAC-PC 104 or another destination. The PC 103 with the IP address indicated in the ARP request of new PC 103a will also receive the ARP request, and PC 103 will compare the IP address in the ARP request and its own IP address, detect the address match and send an ARP response to the ARP request indicating the IP and MAC addresses of PC 103. Then the ARP tables of the new PC 103a that sent the ARP request and of the PC 103 that received the ARP request will be updated, and a match between the IP- and MAC addresses will be obtained. Administrative agent 207a of NAC-PC 104 must redirect traffic from new PC 103a to NAC-PC 104 or another destination to ensure that new PC 103a on corporate network 101 or an individual segment thereof conforms to access rules. In some time after administrative agent 207a of NAC-PC 104 receives the ARP request and sees that new PC 103a wants to transmit data to some PC 103, it will send the PC 103a that sent the ARP request and the PC 103 that received the ARP request a new ARP response indicating the IP address of the PC 103 for which the initial ARP request was intended and the MAC address of NAC-PC 104 or another destination. Administrative agent 207a of NAC-PC 104 will also send PC 103 an ARP response indicating the IP address of the new PC 103a that sent the initial ARP request and the MAC address of NAC-PC 104 or another destination. By these actions administrative agent 207a of NAC-PC 104 "poisons" the ARP tables of the new PC 103a that initially sent the ARP request and the PC 103 that initially received the ARP request. The ARP tables of the new PC 103a that initially sent the ARP request and the PC 103 that initially received the ARP request will be updated. In this way, traffic from new PC 103a will be sent to NAC-PC 104 or another destination. After traffic from new PC 103a is redirected to NAC-PC 104 or another destination, the new PC 103a on corporate network 101 or an individual segment thereof will be checked for conformance to access rules. After traffic from new PC 103a is redirected, the user of new PC 103a from corporate network 101 or an individual segment thereof may enter only the Internet page offered by administrative agent 207a of NAC-PC 104. As soon as a user on new PC 103a from corporate network 101 or an individual segment thereof opens an Internet browser, administrative agent 207a of NAC-PC 104 remotely collects basic information about new PC 103a. Administrative agents 207 of each PC 103 collect this information at the initial stage in the operation of this system during inventorying. Administrative agent 207 is not installed on new PC 103a. In this case, administrative agent 207a of NAC-PC 104 collects the basic information through the Internet page, i.e., using ActiveX technology. For example, after opening an Internet browser on new PC 103a from corporate network 101 or an individual segment and entering the Internet page offered by administrative agent 207a of NAC-PC 104, to which traffic from new PC 103a was redirected, the user of that new PC 103a automatically downloads the ActiveX component, which will collect the set of data about new PC 103a. This data set may be similar to the Data collected by administrative agents 207 of each PC 103 during inventorying. Then, this set of data pertaining to new PC 103a is sent using the ActiveX component to administrative agent 207a of NAC-PC 104 and from it to administration server 102, i.e., to management tool 201. Since the collected set of data pertains to the inventorying of new PC 103a, inventory tool 206 from the series of administrative tools 204 will place the data on server database 205. Then, access control tool 208 from the series of administrative tools 204 initiates a comparison of the collected set of data from new PC 103a stored in server database 205 with the set of criteria that define access rules. Then the access rule or rules will be selected for criteria defined using attributes that are the set of data collected from new PC 103a. Access control tool 208 from the series of administrative tools 204 will send this rule or rules to management tool 201 which in turn will send this rule to administrative agent 207a of NAC-PC 104, which will apply the rule to new PC 103a. As soon as the access rule is applied to new PC 103a on corporate network 101 or an individual segment thereof, administrative agent 207a of NAC-PC 104 updates the ARP tables of new PC 103a and the rest of the PCs 103 on corporate network 101 or an individual segment thereof with the correct, matching IP and MAC addresses. Also, administrative agent 207 will be installed on the new PC 103a using tools intended for these actions from the administrative and management tools 201 and 204.

At step 906, access to the resources of corporate network 101 is limited. Access to the resources of corporate network 101 or an individual segment thereof is controlled using administrative agent 207a of NAC-PC 104, including during interaction with the antivirus application installed on each PC 103 on corporate network 101 or an individual segment thereof. One example of the operation of the system for controlling access to the resources of corporate network for personal computers to restrict access to the resources of corporate network might be the disconnection of PC 103, which is the spreader of unknown executable program code, from corporate network 101 or an individual segment thereof. The approach may be the same if a network attack is detected. For example, administrative agent 207 may also track whether the antivirus application was correctly turned off. When a certain threshold is reached with respect to the number of PCs 103 on which the antivirus protection was incorrectly turned off, access control tool 208 from the series of administrative tools 204 will, via management tool 201, send administrative agent 207a of NAC-PC 104 a command to disconnect the PCs 103 on which the antivirus protection was incorrectly turned off.

Figure 10:
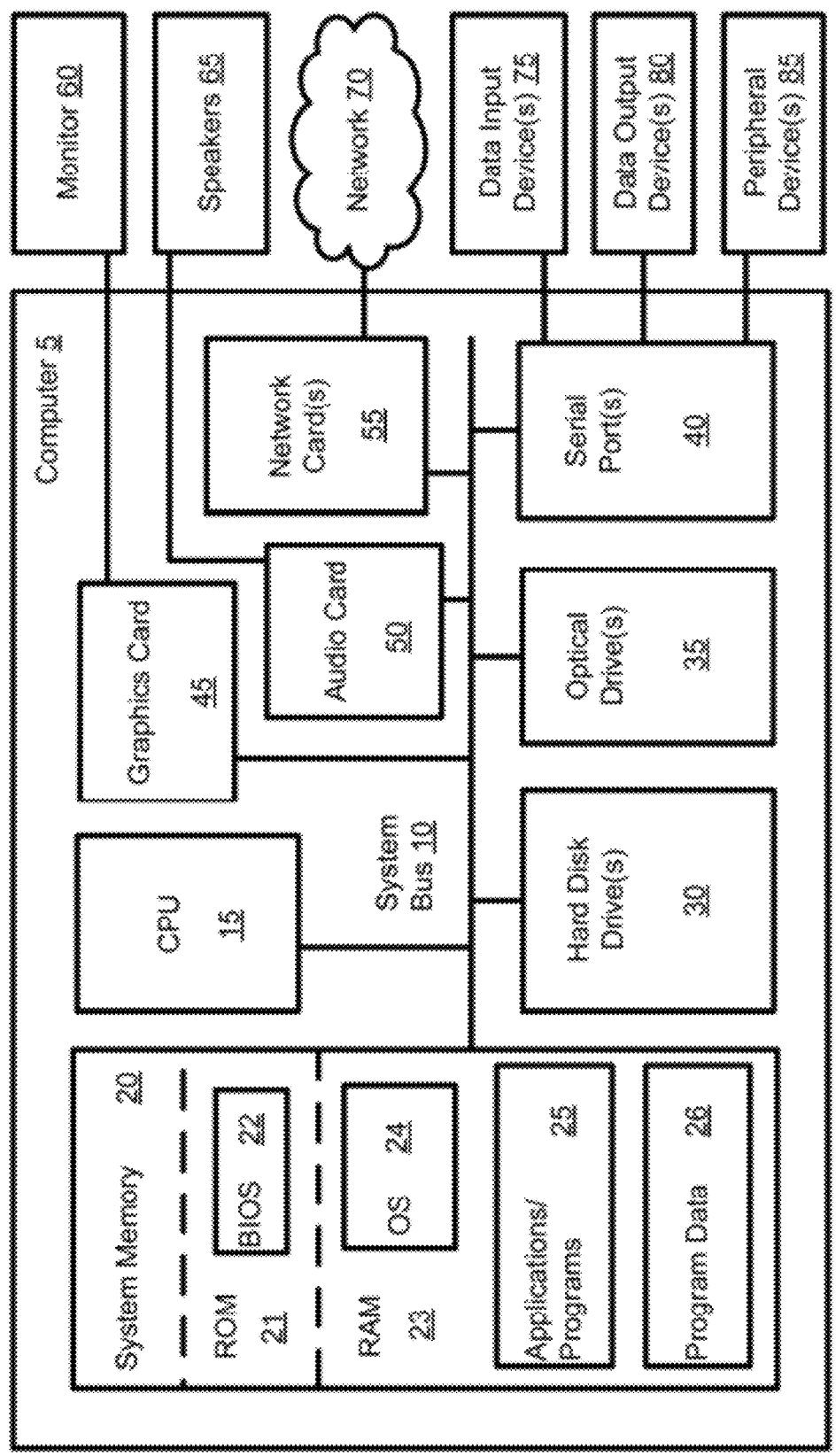
FIG. 10 illustrates a schematic diagram of a computer system in accordance with one example embodiment.

FIG. 10 depicts one example embodiment of a computer system 5, which could be used to implement the administration server 102 and/or a PC 103. As shown, computer system may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25, such as administrative tools 204. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for controlling access to a computer network, the method comprising:
 intercepting by a network access controller a data transmission to or from a computer, wherein the network access controller includes a device associated with the network that has the highest performance rating among a plurality of computers in the network, and wherein the performance rating is determined based on the device's configuration and network topology;
 identifying by the network access controller a network access policy associated with said computer;

if there is a network access policy associated with said computer, allowing the data transmission to or from said computer based on the associated network access policy;

if there is no network access policy associated with said computer, deploying on said computer an administration agent configured to collect configuration information from said computer and information about topology of said network and send the collected information to the network access controller;

determining by the network access controller a network access policy for said computer based on the collected information;

redirecting the intercepted data transmission based on the network access policy;

activating via the administrative agent of said computer an antivirus software on said computer, the antivirus software configured to perform antivirus analysis of said computer, and, if a malicious activity is detected on said computer, report about said activity to the network access controller; and limiting by the network access controller data transmissions to or from said computer until the malicious activity is eliminated by the antivirus software to prevent spread of the malicious activity to other computers in the network.

2. The method of claim 1 further comprising:

collecting by a plurality of administration agents deployed on the plurality of computers in the network configuration information of each of the plurality of computers and information about topology of said network;

transmitting the collected information to an administration server for selecting from the plurality of computers in the network the network access controller for the network and determining network access policies for each of the plurality of computers; and receiving by the selected network access controller a plurality of network access policies for the plurality of computers, wherein the network access controller uses the network access policies to regulate access to and from the plurality of the computers to the network.

3. The method of claim 1, wherein intercepting by the network access controller a data transmission to or from a computer further comprises:

receiving by the network access controller a broadcast message from said computer, wherein the broadcast message is an Address Resolution Protocol (ARP) request message addressed to another computer in the network;

transmitting by the network access controller an ARP response message to said computer, wherein the ARP response message containing an IP address of the computer to which the ARP request message was addressed and MAC address of the network access controller; and transmitting by the network access controller an ARP response message to the computer to which the ARP request message was addressed, wherein the ARP response message containing an IP address of said computer and MAC address of the network access controller.

4. The method of claim 1, wherein intercepting by the network access controller a data transmission to or from a computer further comprises:

receiving by the network access controller a broadcast message from said computer, wherein the broadcast message is an ARP announce message;

transmitting by the network access controller a plurality of ARP response messages to said computer, wherein the number of ARP response messages corresponds to the number of computers in the network, and wherein each ARP response message contains an IP address of a computer in the network and MAC address of the network access controller; and transmitting by the network access controller an ARP response message to each of the plurality of computers in the network, wherein said ARP response message containing an IP address of said computer and MAC address of the network access controller.

5. The method of claim 1, wherein redirecting the intercepted data transmission based on the network access policy further comprises:

transmitting by the network access controller a plurality of ARP response messages to said computer, wherein the number of ARP response messages corresponds to the number of computers in the network to which access by said computer is allowed, and wherein each ARP response message contains an IP address and MAC address of a computer in the network to which access by said computer is allowed; and transmitting by the network access controller an ARP response message to each of the plurality of computers to which access by said computer is allowed, the ARP response message containing an IP address and MAC address of said computer.

6. A system for controlling access to a computer network, the system comprising:

a network access controller comprising a processor and a memory, wherein the network access controller includes a device associated with the network that has the highest performance rating among a plurality of computers in the network, and wherein the performance rating is determined based on the device's configuration and network topology;

wherein the memory is configured to store a plurality of network access policies for a plurality of computers in the network; and wherein the processor is configured to:
  intercept a data transmission to or from a computer;
  identify a network access policy associated with said computer;
  if there is a network access policy associated with said computer, allow the data transmission to or from said computer based on the associated network access policy;
  if there is no network access policy associated with said computer, deploy on said computer an administration agent configured to collect configuration information from said computer and information about topology of said network and send the collected information to the network access controller;
  determine a network access policy for said computer based on the collected information;
  redirect the intercepted data transmission based on the network access policy;
  activate via the administrative agent of said computer an antivirus software on said computer, the antivirus software configured to perform antivirus analysis of said computer, and, if a malicious activity is detected on said computer, report about said activity to the network access controller; and
  limit data transmissions to or from said computer until the malicious activity is eliminated by the antivirus software to prevent spread of the malicious activity to other computers in the network.

7. The system of claim 6, further comprising an administration server, wherein the administration server configured to:
receive from a plurality of administration agents deployed on the plurality of computers in the network configuration information of each of the plurality of computers and information about topology of said network;
select from the plurality of computers in the network the network access controller for the network;
determine a network access policy for each of the plurality of computers; and
transmit to the selected network access controller a plurality of network access policies for the plurality of computers, whereby the network access controller uses the network access policies to regulate access to and from the plurality of the computers to the network.

8. The system of claim 6, wherein to intercept a data transmission to or from a computer, the processor further configured to:
receive a broadcast message from said computer, wherein the broadcast message is an ARP request message addressed to another computer in the network;
transmit an ARP-response message to said computer, wherein the ARP response message containing an IP address of the computer to which the ARP request message was addressed and MAC address of the network access controller; and
transmit an ARP response message to the computer to which the ARP-request message was addressed, wherein the ARP response message containing an IP address of said computer and MAC address of the network access controller.

9. The system of claim 6, wherein to intercept a data transmission to or from a computer, the processor further configured to:
receive a broadcast message from said computer, wherein the broadcast message is an ARP announce message;
transmit a plurality of ARP response messages to said computer, wherein the number of ARP-response messages corresponds to the number of computers in the network, and wherein each ARP-response message contains an IP address of a computer in the network and MAC address of the network access controller; and
transmit an ARP response message to each of the plurality of computers in the network, wherein the ARP response message containing an IP address of said computer and MAC address of the network access controller.

10. The system of claim 6, wherein to redirect the intercepted data transmission based on the network access policy, the processor further configured to:
transmit a plurality of ARP response messages to said computer, wherein the number of ARP-response messages corresponds to the number of computers in the network to which access by said computer is allowed, and wherein each ARP response message contains an IP address and MAC address of a computer in the network to which access by said computer is allowed; and
transmit an ARP-response message to each of the plurality of computers to which access by said computer is allowed, the ARP-response message containing an IP address and MAC address of said computer.

11. A computer program product embedded in a non-transitory computer-readable storage medium, the computer-readable storage medium comprising computer-executable instructions for controlling access to a computer network, the medium comprises instructions for:
intercepting by a network access controller a data transmission to or from a computer, wherein the network access controller includes a device associated with the network that has the highest performance rating among a plurality of computers in the network, and wherein the performance rating is determined based on the device's configuration and network topology;
identifying by the network access controller a network access policy associated with said computer;
if there is a network access policy associated with said computer, allowing the data transmission to or from said computer based on the associated network access policy;
if there is no network access policy associated with said computer, deploying on said computer an administration agent configured to collect configuration information from said computer and information about topology of said network and send the collected information to the network access controller;
determining by the network access controller a network access policy for said computer based on the collected information;
redirecting the intercepted data transmission based on the network access policy;
activating via the administrative agent of said computer an antivirus software on said computer, the antivirus software configured to perform antivirus analysis of said computer, and, if a malicious activity is detected on said computer, report about said activity to the network access controller; and
limiting by the network access controller data transmissions to or from said computer until the malicious activity is eliminated by the antivirus software to prevent spread of the malicious activity to other computers in the network.

12. The product of claim 11 further comprising instructions for:
collecting by a plurality of administration agents deployed on the plurality of computers in the network configuration information of each of the plurality of computers and information about topology of said network;
transmitting the collected information to an administration server for selecting from the plurality of computers in the network the network access controller for the network and determining network access policies for each of the plurality of computers; and
receiving by the selected network access controller a plurality of network access policies for the plurality of computers, wherein the network access controller uses the network access policies to regulate access to and from the plurality of the computers to the network.

13. The product of claim 11, wherein instructions for intercepting by the network access controller a data transmission to or from a computer further comprise instructions for:
receiving by the network access controller a broadcast message from said computer, wherein the broadcast message is an Address Resolution Protocol (ARP) request message addressed to another computer in the network;
transmitting by the network access controller an ARP response message to said computer, wherein the ARP response message containing an IP address of the computer to which the ARP request message was addressed and MAC address of the network access controller; and
transmitting by the network access controller an ARP response message to the computer to which the ARP request message was addressed, wherein the ARP response message containing an IP address of said computer and MAC address of the network access controller.

14. The product of claim 11, wherein instructions for intercepting by the network access controller a data transmission to or from a computer further comprise instructions for:
receiving by the network access controller a broadcast message from said computer, wherein the broadcast message is an ARP announce message;
transmitting by the network access controller a plurality of ARP response messages to said computer, wherein the number of ARP response messages corresponds to the number of computers in the network, and wherein each ARP response message contains an IP address of a computer in the network and MAC address of the network access controller; and
transmitting by the network access controller an ARP response message to each of the plurality of computers in the network, wherein said ARP response message containing an IP address of said computer and MAC address of the network access controller.

15. The product of claim 11, wherein instructions for redirecting the intercepted data transmission based on the network access policy further comprise instructions for:
transmitting by the network access controller a plurality of ARP response messages to said computer, wherein the number of ARP response messages corresponds to the number of computers in the network to which access by said computer is allowed, and wherein each ARP response message contains an IP address and MAC address of a computer in the network to which access by said computer is allowed; and
transmitting by the network access controller an ARP response message to each of the plurality of computers to which access by said computer is allowed, the ARP response message containing an IP address and MAC address of said computer.

* * * * *